(12) United States Patent
Han et al.

(10) Patent No.: US 12,541,105 B2
(45) Date of Patent: Feb. 3, 2026

(54) DISPLAY DEVICE INCLUDING LIGHT WAVEGUIDE USING META STRUCTURE AND ELECTRONIC DEVICE INCLUDING THE SAME

(71) Applicant: SAMSUNG ELECTRONICS CO., LTD., Suwon-si (KR)

(72) Inventors: Seunghoon Han, Seoul (KR); Hyunsung Park, Suwon-si (KR); Hyeonsoo Park, Seoul (KR); Changgyun Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 875 days.

(21) Appl. No.: 17/592,145

(22) Filed: Feb. 3, 2022

(65) Prior Publication Data

US 2022/0321849 A1 Oct. 6, 2022

Related U.S. Application Data

(60) Provisional application No. 63/170,194, filed on Apr. 2, 2021.

(30) Foreign Application Priority Data

Jul. 19, 2021 (KR) .................... 10-2021-0094459
Aug. 4, 2021 (KR) .................... 10-2021-0102678

(51) Int. Cl.
*G02B 27/01* (2006.01)
*G02B 27/09* (2006.01)
*H04N 9/31* (2006.01)

(52) U.S. Cl.
CPC ....... *G02B 27/0172* (2013.01); *G02B 27/017* (2013.01); *G02B 27/0176* (2013.01);
(Continued)

(58) Field of Classification Search
CPC .............. G02B 27/017; G02B 27/0172; G02B 2027/0174; G02B 27/0176; G02B 2027/0178
See application file for complete search history.

(56) References Cited

U.S. PATENT DOCUMENTS 10,267,970 B2 *   4/2019   Jones, Jr. ................ G06F 1/163
10,527,865 B2 *   1/2020   Yang .................. G02B 27/0081
(Continued)

FOREIGN PATENT DOCUMENTS

CN        211905884 U   * 11/2020
CN        114185123 A   *  3/2022 ........... G02B 5/1814
(Continued)

OTHER PUBLICATIONS

Guo et al., "Molding free-space light with guided wave-driven metasurfaces", 2020, Science Advances, vol. 6, 9 pages total, https://advances.sciencemag.org/content/6/29/eabb4142.
(Continued)

*Primary Examiner* — Bao-Luan Q Le
(74) *Attorney, Agent, or Firm* — Sughrue Mion, PLLC

(57) ABSTRACT

A display device includes: an image projector including an image forming device and a meta-lens module and configured to output image light formed by the image forming device; and a meta-waveguide configured to transfer the image light output from the image projector, to an observer's field of view, the meta-waveguide including waveguide element configured to totally reflect light inside, an input coupler including a plurality of first nanostructures forming a first phase gradient in a first direction and configured to couple the image light from the image projector to an inside of the waveguide element, and an output coupler including a plurality of second nanostructures forming a second phase gradient in a second direction different from the first direction and configured to output the light coupled to the inside
(Continued)

of the waveguide element by the input coupler, to an outside of the waveguide element.

24 Claims, 16 Drawing Sheets

(52) U.S. Cl.
CPC .... *G02B 27/0961* (2013.01); *G02B 2207/101* (2013.01); *H04N 9/3152* (2013.01)

(56) References Cited

U.S. PATENT DOCUMENTS

| | | | |
|---|---|---|---|
| 10,564,330 B2 * | 2/2020 | Ahmed | G02B 5/021 |
| 10,747,012 B2 * | 8/2020 | Yang | G02B 27/4272 |
| 11,391,960 B2 * | 7/2022 | Yang | G02B 27/0172 |
| 11,474,395 B2 | 10/2022 | Malhotra | G02B 5/18 |
| 2018/0143470 A1 | 5/2018 | Oh et al. | |
| 2018/0217395 A1 * | 8/2018 | Lin | G02B 1/002 |
| 2019/0004219 A1 * | 1/2019 | Tervo | G02B 5/18 |
| 2019/0064532 A1 * | 2/2019 | Riley, Jr. | H01L 27/14625 |
| 2019/0121004 A1 | 4/2019 | Ahmed et al. | |
| 2019/0137665 A1 * | 5/2019 | You | G03B 21/2033 |
| 2019/0137777 A1 * | 5/2019 | Yang | G02B 27/4255 |
| 2019/0250406 A1 * | 8/2019 | Nakamura | G02B 27/0172 |
| 2020/0073031 A1 * | 3/2020 | Born | G02B 27/0101 |
| 2020/0110278 A1 * | 4/2020 | Yang | G02B 5/1814 |
| 2020/0166691 A1 | 5/2020 | Vartiainen et al. | |
| 2020/0209630 A1 * | 7/2020 | Schultz | G02B 27/0081 |
| 2020/0400955 A1 * | 12/2020 | Messer | G06F 3/017 |
| 2020/0409164 A1 * | 12/2020 | Yang | G02B 27/0172 |
| 2021/0014394 A1 | 1/2021 | Han et al. | |
| 2021/0018753 A1 | 1/2021 | Browy et al. | |
| 2021/0043611 A1 | 2/2021 | Ahmed et al. | |
| 2021/0044748 A1 * | 2/2021 | Hu | G02B 1/002 |
| 2021/0064082 A1 * | 3/2021 | Yang | G02B 27/283 |
| 2021/0080637 A1 * | 3/2021 | Brick | G02B 27/0172 |
| 2021/0191180 A1 * | 6/2021 | Malhotra | C08L 67/00 |
| 2021/0263190 A1 * | 8/2021 | Li | G02B 27/0172 |
| 2021/0397004 A1 * | 12/2021 | Schowengerdt | G02B 6/0076 |
| 2022/0163797 A1 * | 5/2022 | Kim | G02B 6/005 |
| 2022/0365482 A1 * | 11/2022 | Yu | G03H 1/0248 |
| 2023/0273434 A1 * | 8/2023 | Vinish | G02B 27/0172 359/359 |
| 2024/0019698 A1 * | 1/2024 | Crosby | G02B 6/34 |

FOREIGN PATENT DOCUMENTS

| | | | | |
|---|---|---|---|---|
| CN | 114185174 A | * | 3/2022 | G02B 6/005 |
| CN | 114200571 A | * | 3/2022 | G02B 6/0016 |
| CN | 221326797 U | * | 7/2024 | |
| WO | 2019/195186 A1 | | 10/2019 | |
| WO | 2020/139755 A1 | | 7/2020 | |

OTHER PUBLICATIONS

Huang, et al., "Metagrating-based augmented reality near-eye display", 2021, Proceedings of Spie, vol. 11765, 6 pages total, XP060140738.

Communication issued Jul. 20, 2022 by the European Patent Office for European Patent Application No. 22155416.5.

* cited by examiner

DISPLAY DEVICE INCLUDING LIGHT WAVEGUIDE USING META STRUCTURE AND ELECTRONIC DEVICE INCLUDING THE SAME

CROSS-REFERENCE TO RELATED APPLICATIONS

This application is based on and claims the benefit of U.S. Provisional Patent Application No. 63/170,194, filed on Apr. 2, 2021, in the United States Patent and Trademark Office, and claims priority under 35 U.S.C. § 119 to Korean Patent Application Nos. 10-2021-0094459 and 10-2021-0102678, filed on Jul. 19, 2021, and Aug. 4, 2021, respectively, in the Korean Intellectual Property Office, the disclosures of which are incorporated herein by reference in their entirety.

BACKGROUND

1. Field

The disclosure relates to a display device and an electronic device including the same

2. Description of the Related Art

Recently, there has been increasing interest in micro display devices applicable as a wearable display device implementing a virtual reality device, an augmented reality device, etc.

A solution for reducing the weight and thickness of a micro display device while maintaining the image quality transferred to user's eyes is continuously being sought. To this end, as an example, a light waveguide-based optical system is being used in the micro display devices.

SUMMARY

Provided is a waveguide-based micro display device.

Provided is an electronic device using a display device.

Additional aspects will be set forth in part in the description which follows and, in part, will be apparent from the description, or may be learned by practice of the presented embodiments of the disclosure.

According to an aspect of the disclosure, there is provided a display device including: an image projector including an image forming device and a meta-lens module, the image projector configured to output image light formed by the image forming device; and a meta-waveguide configured to transfer the image light output from the image projector, to a field of view of a user, the meta-waveguide including: a waveguide element configured to totally reflect light inside the waveguide element, an input coupler comprising a plurality of first nanostructures configured to form a first phase gradient in a first direction, the input coupler configured to couple the image light from the image projector to the inside of the waveguide element, and an output coupler comprising a plurality of second nanostructures configured to form a second phase gradient in a second direction different from the first direction, the output coupler configured to output the image light coupled to the inside of the waveguide element by the input coupler, to an outside of the waveguide element.

The meta-waveguide may further include a magnification coupler provided between the input coupler and the output coupler, the magnification coupler comprising a plurality of third nanostructures configured to form a third phase gradient in a third direction different from the first direction and the second direction.

The third direction may be a direction opposite to a vector sum of the first direction and the second direction.

The meta-lens module may include one or more meta-lenses, the meta-lens being configured to make the image light formed by the image forming device to be incident on the input coupler.

The one or more meta-lenses may include a substrate and a plurality of fourth nanostructures arranged on a first surface of the substrate, having a first refractive index higher than a second refractive index of the substrate and having a shape dimension smaller than a central wavelength of the image light formed by the image forming device.

A height of the fourth nanostructures may be in a range from $0.5\lambda 0$ to $7\lambda 0$.

A shape or an arrangement of each of the plurality of fourth nanostructures may be set so that a phase modulation pattern in a fourth range is repeated from a center of the one or more meta-lenses in a radial direction.

The meta-lens module may further include a micro lens array comprising a micro lens corresponding to each of a plurality of pixels of the image forming device.

The micro lens array may be integrally formed on a second surface of the substrate different from the first surface of the substrate.

The first phase gradient may be in a form in which a phase modulation pattern of a first range is repeated in the first direction.

The plurality of first nanostructures may be two-dimensionally arranged, and wherein two or more of the plurality of first nanostructures may be arranged on a same line in a direction perpendicular to the first direction have a same shape and size.

The second phase gradient may be in a form in which a phase modulation pattern of a second range is repeated in the second direction.

The plurality of second nanostructures may be two-dimensionally arranged, and wherein two or more of the plurality of second nanostructures may be arranged on a same line in a direction perpendicular to the second direction have a same shape and size.

The third phase gradient may be in a form in which a phase modulation pattern of a third range is repeated in the third direction.

The plurality of third nanostructures may be two-dimensionally arranged, and wherein two or more of the plurality of third nanostructures arranged on a same line in a direction perpendicular to the third direction have a same shape and size.

Each of the plurality of first, second, and third nanostructures may have a shape dimension smaller than a central wavelength of the image light output from the image projector.

The plurality of first nanostructures, the plurality of second nanostructures, or the plurality of third nanostructures may be integrally formed with the waveguide element.

The plurality of first nanostructures, the plurality of second nanostructures, or the plurality of third nanostructures are arranged in a plurality of layers.

The image projector may be a first image projector configured to output image light of a first wavelength band; a second image projector configured to output image light of a second wavelength band; and a third image projector configured to output image light of a third wavelength band, and wherein the meta-waveguide may include: a first meta-waveguide configured to transfer the image light output from the first image projector, to the field of view of the user; a second meta-waveguide configured to transfer the image light output from the second image projector, to the field of view of the user; and a third meta-waveguide configured to transfer the image light output from the third image projector, to the field of view of the user.

Among the plurality of first, second, and third nanostructures, each of nanostructures provided in the first meta-waveguide may have a shape dimension smaller than a central wavelength of the first wavelength band, each of nanostructures provided in the second meta-waveguide may have a shape dimension smaller than a central wavelength of the second wavelength band, and each of nanostructures provided in the third meta-waveguide may have a shape dimension smaller than a central wavelength of the third wavelength band.

The meta-waveguide may be configured to transmit ambient light that is incident in front of the user.

The display device may be a wearable device.

According to another aspect of the disclosure, there is provide an electronic device including the display device.

The electronic device may be a vehicle, an augmented reality device, a virtual reality device, a mobile device, or a smart phone.

According to another aspect of the disclosure, there is provided an image forming device configured to generate and output an image; and a meta-lens module configured to direct light corresponding to the image output by the image forming device towards an input coupler of a waveguide, wherein the meta-lens module includes: one or more meta-lenses, each including a substrate and a plurality of nanostructures arranged on a first surface of the substrate, wherein the plurality of nanostructures are configured to have a first refractive index different than a second refractive index of the substrate.

According to another aspect of the disclosure, there is provided a display device including: a meta-waveguide; an image forming device configured to generate and output an image; and a meta-lens module configured to direct light corresponding to the image output by the image forming device towards an input coupler of the meta-waveguide, wherein the meta-lens module includes: one or more meta-lenses, each including a substrate and a plurality of nanostructures arranged on a first surface of the substrate, wherein the plurality of nanostructures are configured to have a first refractive index different than a second refractive index of the substrate, wherein the meta-waveguide includes: a waveguide element configured to totally reflect light inside the waveguide element, the input coupler comprising a plurality of first nanostructures configured to form a first phase gradient in a first direction, the input coupler configured to couple the light corresponding to the image to the inside of the waveguide element, and an output coupler comprising a plurality of second nanostructures configured to form a second phase gradient in a second direction different from the first direction, the output coupler configured to output the light corresponding to the image, which is coupled to the inside of the waveguide element by the input coupler, to an outside of the waveguide element.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
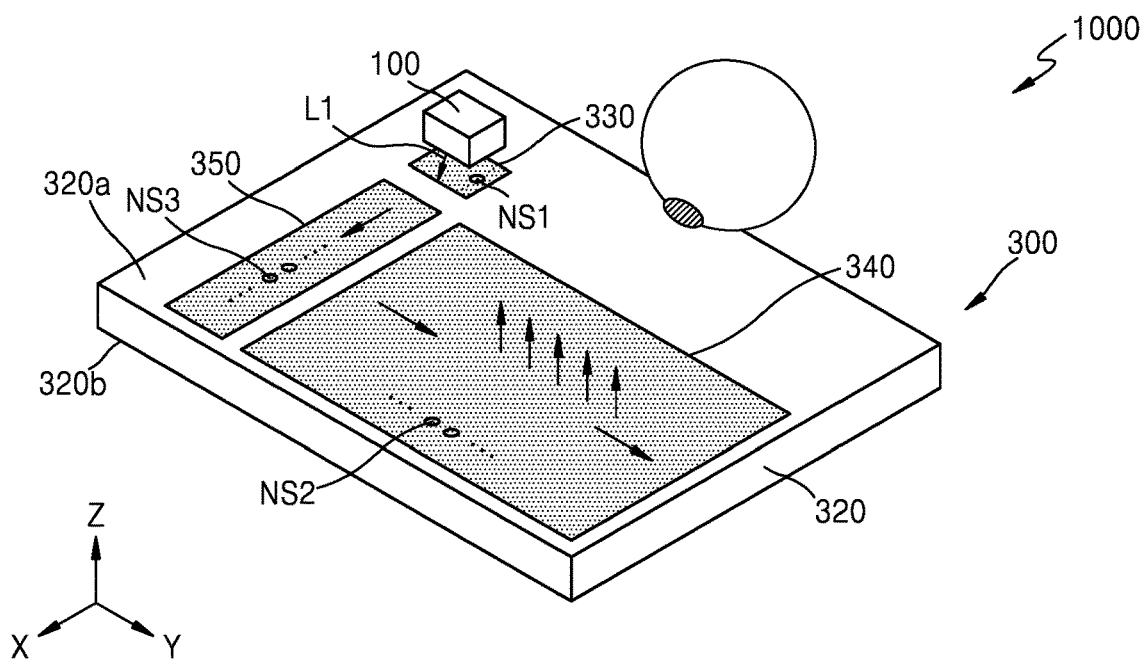
FIG. 1 is a perspective view showing a schematic configuration of a display device according to an example embodiment.

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments will be described in detail with reference to the accompanying drawings. Embodiments described below are merely examples and various modifications may be made therein. In the drawings, the same reference numerals represent the same elements, and a size of each element may be exaggerated for clarity and convenience of description.

It will be understood that when one element is referred to as being "on" or "above" another element, the element may be on the other element in direct contact with the other element or without contacting the other element.

The terms 'first', 'second,' etc. may be used to describe various elements but are only used herein to distinguish one element from another element. These terms are not intended to limit materials or structures of elements.

As used herein, the singular expressions are intended to include plural forms as well, unless the context clearly dictates otherwise. It will be understood that when an element is referred to as "including" another element, the element may further include other elements unless mentioned otherwise.

Terms such as "unit", "module," and the like, when used herein, represent units for processing at least one function or operation, which may be implemented by hardware, software, or a combination of hardware and software.

The term "the" and demonstratives similar thereto may be understood to include both singular and plural forms.

Unless explicitly stated that operations of a method should be performed in an order described below, the operations may be performed in an appropriate order. In addition, all terms indicating examples (e.g., etc.) are only for the purpose of describing technical ideas in detail, and thus the scope of the present disclosure is not limited by these terms unless limited by the claims.

Figure 2:
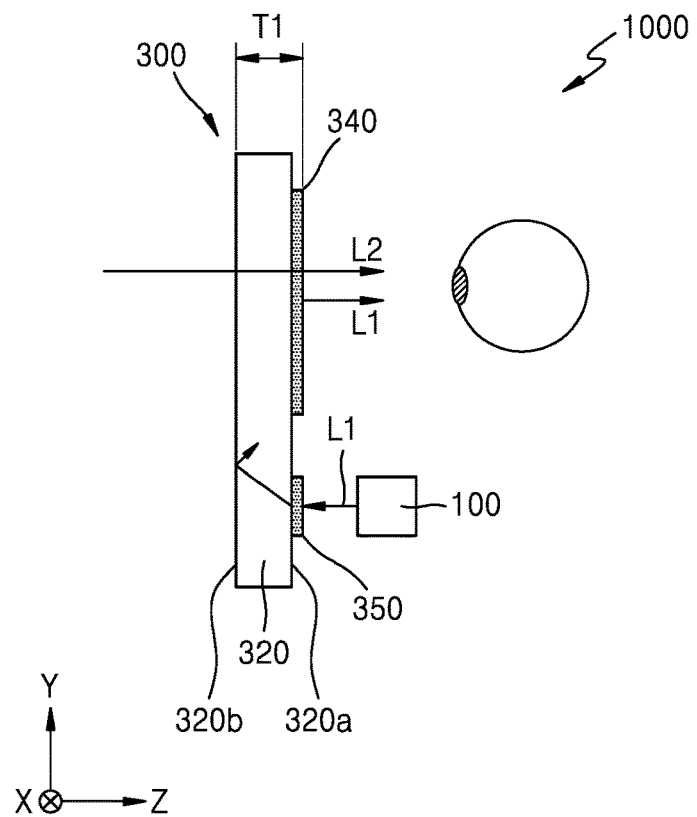
FIG. 2 is a side view showing a schematic configuration of the display device in FIG. 1 according to an example embodiment.
Figure 3:
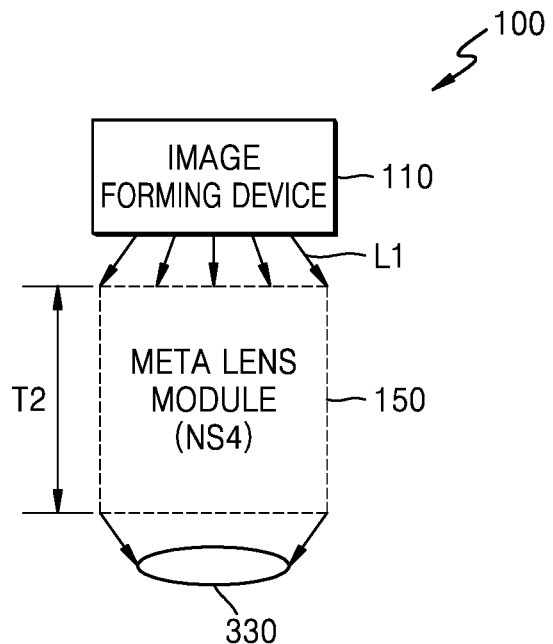
FIG. 3 is a conceptual diagram showing a schematic configuration of an image projector provided in the display device according to an example embodiment.

FIG. 1 is a perspective view showing a schematic configuration of a display device 1000 according to an example embodiment, FIG. 2 is a side view showing a schematic configuration of the display device 1000 according to an example embodiment, and FIG. 3 is a conceptual diagram showing a schematic configuration of an image projector 100 provided in the display device 1000 of FIG. 1.

The display device 1000 includes the image projector 100 that outputs image light L1 and a meta-waveguide 300 that transmits the image light L1 output from the image projector 100 to an observer's field of view. Here, the image light L1 may be light depicting the image projected by the projector 100.

The meta-waveguide 300 includes a waveguide element 320 totally reflecting light therein, an input coupler 330 coupling the image light L1 from the image projector 100 to the inside of the waveguide element 320, and an output coupler 340 outputting the light, which is coupled to the inside of the waveguide element 320 by the input coupler 330, to the outside of the waveguide element 320.

The waveguide element 320 includes an optically transparent material, and may include glass having a refractive index greater than 1 or a transparent plastic material. According to an example embodiment, the transparent material may be a material through which the image light L1 formed by an image forming device 110 may pass through. According to an example embodiment, transparency of the transparent material may not be 100%, and the transparent material may have a certain color. That is, according to an example embodiment, the transparent material may not be 100% transparent.

The input coupler 330 may include a plurality of first nanostructures NS1, and a shape, size, arrangement, etc. of the plurality of first nanostructures NS1 may be set to exhibit a first phase gradient. The output coupler 340 may include a plurality of second nanostructures NS2, and a shape, size, and arrangement, etc. of the plurality of second nanostructures NS2 may be set to exhibit a second phase gradient. According to an example embodiment, the arrangement may include an arrangement gap and/or an arrangement type.

The meta-waveguide 300 may further include a magnification coupler 350 positioned between the input coupler 330 and the output coupler 340. The magnification coupler 350 may include a plurality of third nanostructures NS3, and shapes and an arrangement of the plurality of third nanostructures NS3 may be set to exhibit a third phase gradient.

A thickness T1 of the meta-waveguide 300, as shown in shown in FIG. 2, may range from 0.5 mm to 10 mm.

A path through which the image light L1 output from the image projector 100 reaches the observer's field of view will be briefly described as follows. The image light L1 is coupled to the inside of the waveguide element 320 through the input coupler 330, the image light L1 is totally reflected on an upper surface 320a and a lower surface 320b of the waveguide element 320, and travels inside of the waveguide element 320 in an X direction. In this path, the image light L1 reaching the magnification coupler 350 travels in a Y direction. That is, the image light L1 is totally reflected on the upper surface 320a and the lower surface 320b of the waveguide element 320, and is propagated inside of the waveguide element 320 in the Y direction. The light reaching the output coupler 340 in this path is output to the outside of the meta-waveguide 300 in a Z direction, and reaches the observer's field of view.

The meta-waveguide 300 may also transmit ambient light L2 that is incident in front of the observer. The image light L1 and the ambient light L2 may reach the observer's field of view together.

The image projector 100 may include the image forming device 110 and a meta-lens module 150.

The image forming device 110 modulates light according to image information to be displayed to the observer to form an image. The type of the image formed by the image forming device 110 is not particularly limited, and may be, for example, a 2D image or a 3D image. The 3D image may be, for example, a stereo image, a hologram image, a light field image, or an integral photography (IP) image, and may include a multi-view or super multi-view image The image forming device 110 may include, for example, a liquid crystal on silicon (LCoS) device, a liquid crystal display (LCD) device, an organic light emitting diode (OLED) display device, and a digital micromirror device (DMD), and may further include next-generation display devices such as micro LED and quantum dot (QD) LED. When a display device provided in the image forming device 110 is a non-emission type device such as an LCD device, the image forming device 110 may further include a light source providing light for forming an image.

The meta-lens module 150 is configured to make the image light L1 formed by the image forming device 110 incident on the input coupler 330 provided in the meta-waveguide 300. The meta-lens module 150 may include one or more meta-lenses, and the meta-lenses may include a plurality of fourth nanostructures NS4. Shapes and an arrangement of the plurality of fourth nanostructures NS4 may be set to form a phase gradient capable of exhibiting a certain desired refractive power with respect to the incident light.

A thickness T2 of the meta-lens module 150, as shown in FIG. 3, may range from 5 mm to 15 mm.

According to an example embodiment the first to fourth nanostructures NS1, NS2, NS3, and NS4 are materials exhibiting a difference in refractive index from a surrounding material, and a phase of light that is incident on these nanostructures is delayed due to a refractive index distribution according to shapes and arrangements of the nanostructures. Hereinafter, expressions of a 'phase delay', a 'phase modulation' or a 'phase' by nanostructures may be used interchangeably, all of which mean a relative phase at a position immediately after passing through the nanostructures, with respect to a phase at position before undergoing the refractive index distribution formed by the nanostructures.

The expression 'phase gradient' or 'phase profile' means a function of a position indicating a degree of phase modulation in a space in which the nanostructures are located, along a certain direction, and may be used interchangeably. The phase profile appears differently according to detailed shapes, sizes, and arrangements of the nanostructures. In other words, the detailed shape, size, and arrangement of the nanostructure set for each position may be determined according to a desired phase profile (or phase gradient).

Figure 4:
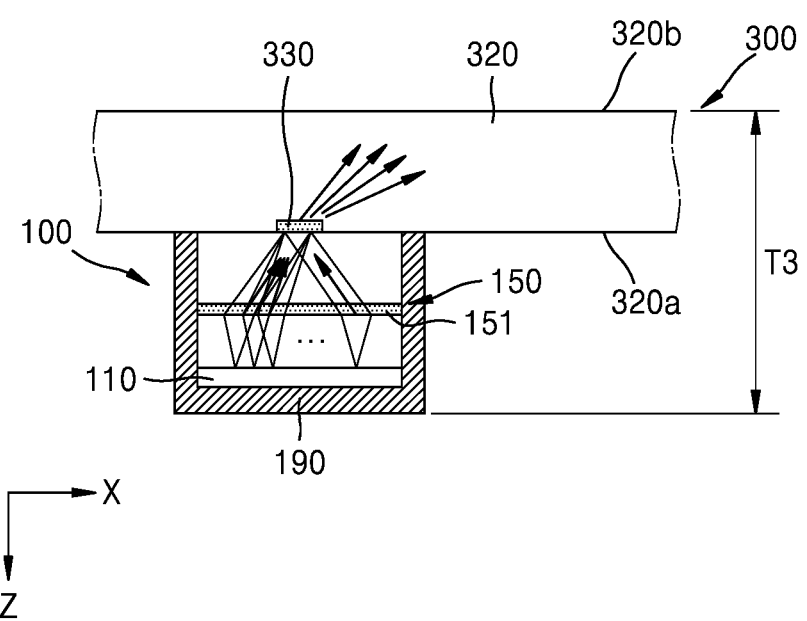
FIGS. 4 to 6 illustrate configurations of an image projector inputting image light to a meta-waveguide through an input coupler in a display device according to an example embodiment.
Figure 5:
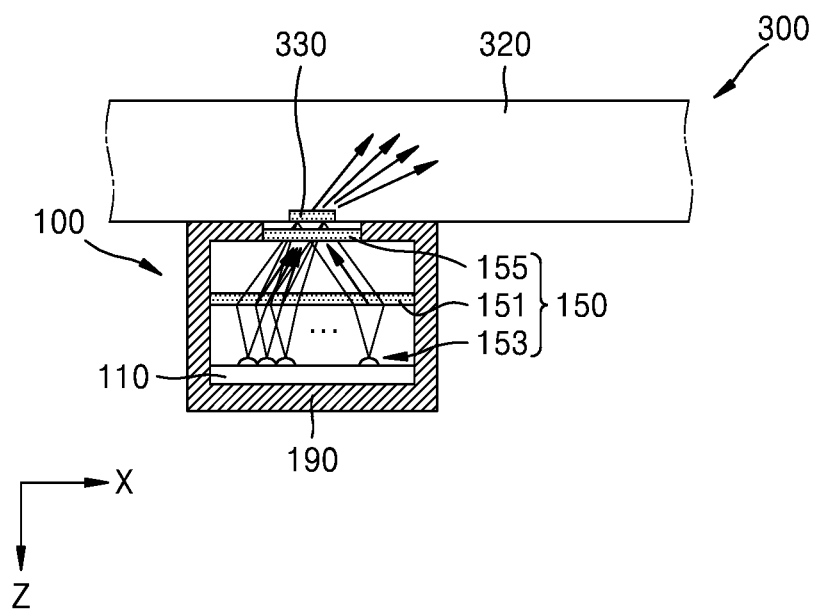
Figure 6:
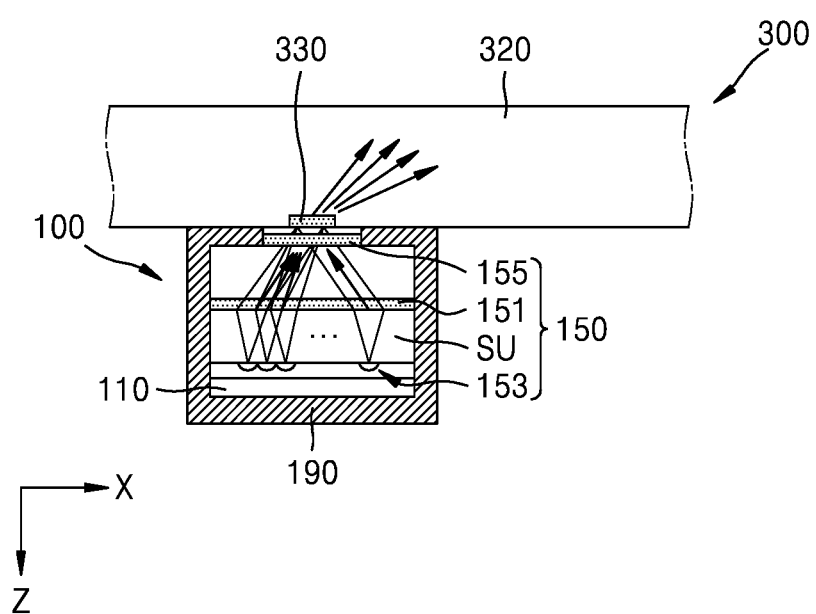

FIGS. 4 to 6 illustrate configurations of the image projector 100 inputting image light to a meta-waveguide through the input coupler 330 in a display device according to an embodiment.

Referring to FIG. 4, the image projector 100 includes the image forming device 110 and the meta-lens module 150, and the meta-lens module 150 may include one meta-lens 151. The image forming device 110 and the meta-lens 151 may be fixed to a housing 190 and attached to the waveguide element 320 to face the input coupler 330.

A total thickness T3 of the meta-waveguide 300 and image projector 100, as shown in FIG. 4, may range from 6 mm to 20 mm, or range 6 mm to 25 mm.

Referring to FIG. 5, the meta-lens module 150 of the image projector 100 may further include a micro lens array 153. The micro lens array 153 may include micro lenses facing a plurality of pixels of the image forming device 110. The meta-lens module 150 may also include two meta-lenses 151 and 155.

Referring to FIG. 6, the micro lens array 153 and the meta-lens 151 may be respectively formed on both sides of a substrate SU to have an integrated structure.

The meta-lens module 150 illustrated in FIGS. 4 to 6 is an example, and the number or positions of the meta-lenses 151 and 155 provided therein may be changed. The meta-lenses 151 and 155 illustrated in FIGS. 4 to 6 will be described in detail with reference to FIGS. 7 to 9.

Figure 7:
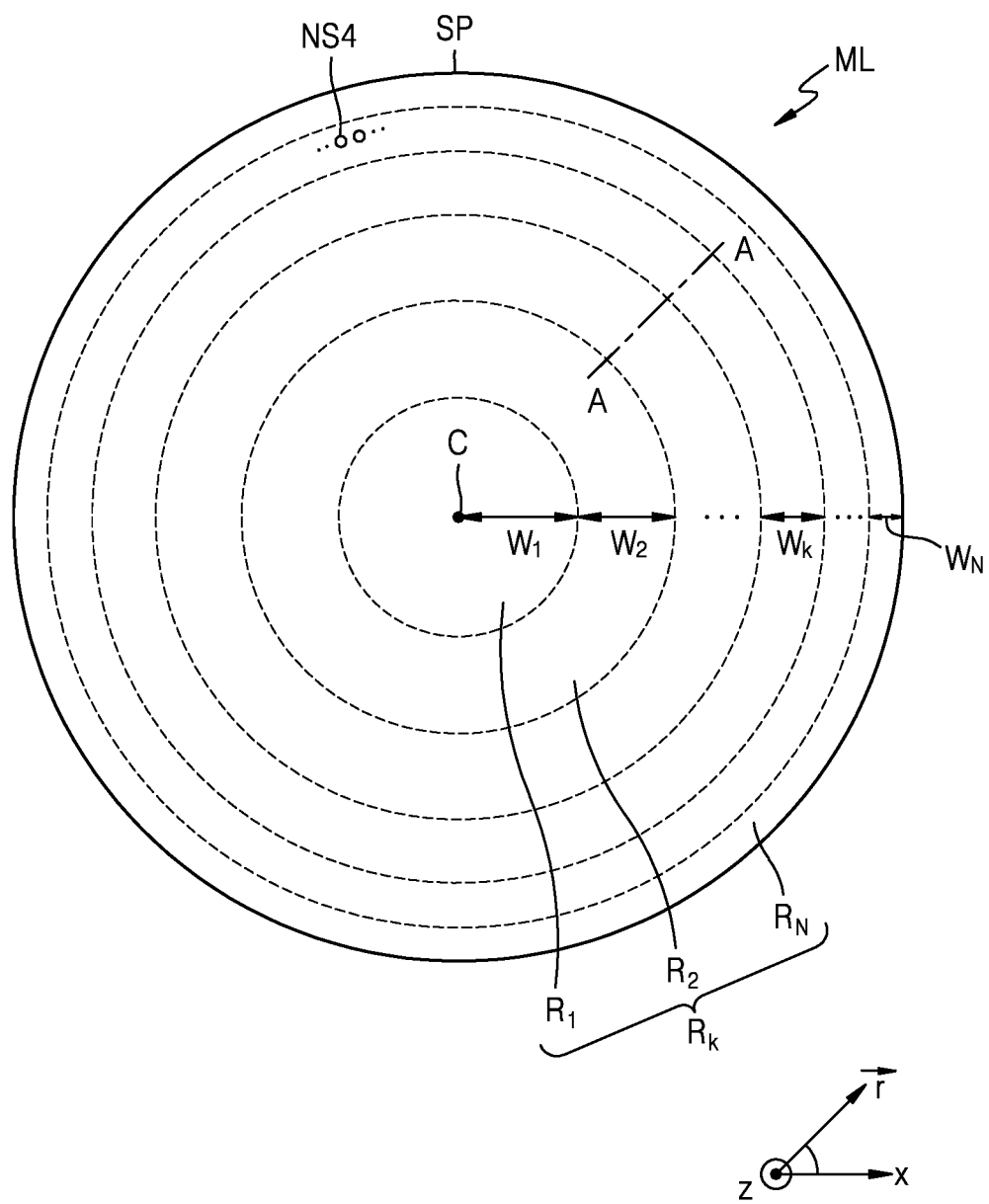
FIG. 7 is a plan view illustrating a configuration of a meta-lens provided in a display device according to an example embodiment.
Figure 8:
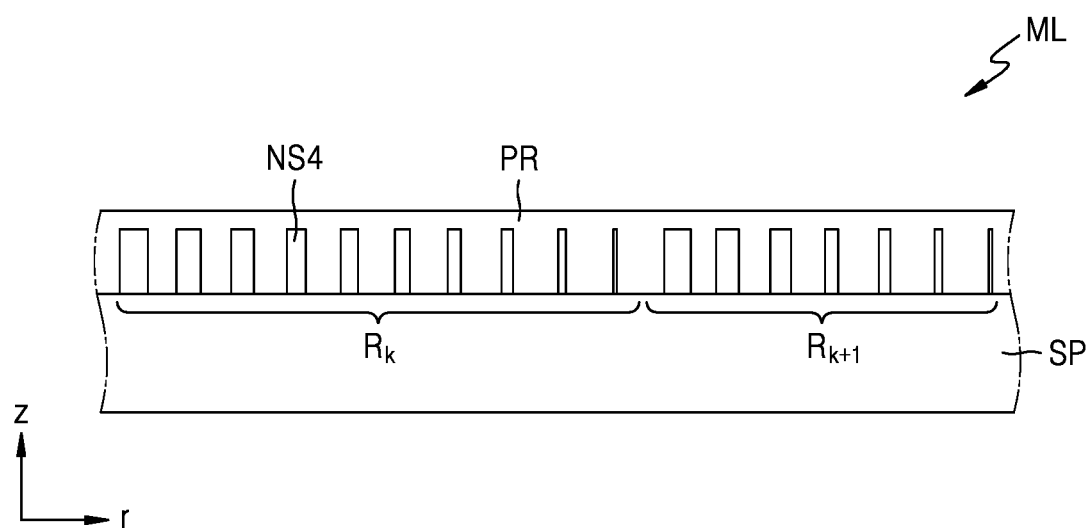
FIG. 8 is a cross-sectional view taken along line A-A of FIG. 7.
Figure 9:
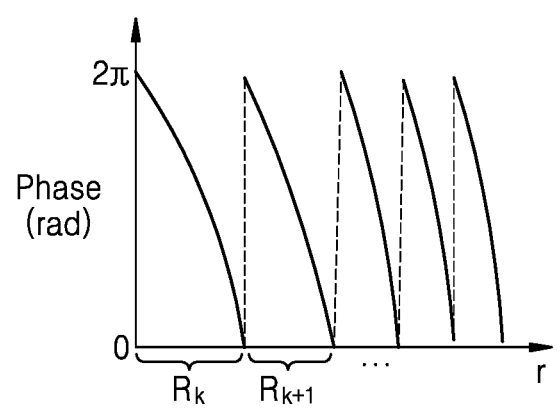
FIG. 9 shows a phase profile of the meta-lens of FIG. 7.

FIG. 7 is a plan view illustrating a configuration of a meta-lens ML provided in a display device according to an example embodiment, FIG. 8 is a cross-sectional view taken along line A-A of FIG. 7, and FIG. 9 shows a phase profile of the meta-lens ML of FIG. 7.

The meta-lens ML modulates a phase of image light of a certain wavelength band formed by the image forming device 110. According to an example embodiment, the meta-lens ML includes the plurality of fourth nanostructures NS4. The certain wavelength band may be a band including a visible light band or a part of the visible light band, or an infrared band or a part of the infrared band, or all of them. The fourth nanostructure NS4 may be provided on a support layer SP. The support layer SP may be the substrate SU having a lower surface on which the micro lens array 153 is formed in FIG. 6. For convenience, only some of the fourth nanostructures NS4 are illustrated in FIG. 7, and the number of fourth nanostructures NS4 shown in FIG. 8 is also an example. The fourth nanostructure NS4 has a shape dimension of a sub-wavelength smaller than a central wavelength $\lambda 0$ of the certain wavelength band, and has a refractive index different from that of the support layer SP and other surrounding material. The meta-lens ML may implement various phase profiles with respect to incident light according to an arrangement shape of the fourth nanostructures NS4.

The meta-lens ML includes a plurality of phase modulation regions $R_k$ including the plurality of fourth nanostructures NS4 whose shapes, sizes, and arrangements are determined according to a set rule. The plurality of phase modulation regions $R_k$ may be arranged in a certain direction defining the phase profile, and this direction may be a radial direction r away from a center C of the meta-lens ML as shown. However, the disclosure is not limited thereto.

The rule set in each region of the meta-lens ML is applied to a parameter such as the shape, size (a width and a height), spacing, and arrangement of the fourth nano structure NS4, and may be set according to a phase profile that is to be implemented by the meta-lens ML as a whole, for example, the phase profile illustrated in FIG. 9.

When light is incident on the meta-lens ML in the Z direction and passes through the meta-lens ML, the light meets the refractive index distribution according to the arrangement of the plurality of fourth nanostructures NS4 having different refractive indices from the surrounding material. A position of a wavefront connecting points with the same phase in a traveling path of the light is different before and after undergoing the refractive index distribution according to the arrangement of the fourth nanostructures NS4, which is expressed as a phase delay. A degree of the phase delay differs according to each position that is a variable of the refractive index distribution, that is, according to a position (x, y coordinates) on the plane perpendicular to a traveling direction (z direction) of the light at a position immediately after the light passes through the fourth nanostructures NS4 of the meta-lens ML. When the arrangement of the fourth nanostructures NS4 is polar symmetry or has rotational symmetry of a certain angle with respect to a z-axis, the phase profile may be expressed as a function of a distance r from the center C. Such a phase profile appears differently according to the detailed shape, size, arrangement, etc. of the fourth nanostructure NS4 constituting the meta-lens ML. In other words, the detailed shape, size, arrangement, etc. of the fourth nanostructure NS4 set for each position may be determined according to a desired phase profile.

Each of the plurality of phase modulation regions $R_k$ is a region indicating a phase modulation pattern within a certain range. The plurality of phase modulation regions $R_k$ includes a first region $R_1$, a second region $R_2$, . . . , N-th region $R_N$ sequentially arranged in a radial direction r from the center C of the meta-lens ML. According to an example embodiment, the first region $R_1$ may be a circular region, and the second region $R_2$ to the N-th region $R_N$ may be annular regions. The first region $R_1$ to the N-th region $R_N$ are regions exhibiting a monotonous phase delay in a certain range, and as shown in FIG. 9, the phase modulation range of the second region $R_2$ to the N-th region $R_N$ may be the same. The phase modulation range may be $2\pi$ radians. The phase modulation range of the first region $R_1$ may be smaller than $2\pi$ radians, but all may be referred to as $2\pi$ zones. However, the disclosure is not limited to the shape, the size, the spacing, and/or the arrangement of the regions $R_k$ as illustrated FIG. 7. As such, according to another example embodiment, the regions $R_k$ may have another shape, size, spacing, and/or arrangement.

In FIG. 8, two adjacent regions $R_k$ and $R_{k+1}$ are illustrated, and are regions representing the same phase modulation range. The two regions have different widths in the radial direction r, and thus the two regions are regions having different inclinations of a phase change in the radial direction r, and diffracting incident light at different angles.

The total number N, widths $W_1$, $W_k$, and $W_N$, and the phase profiles of the phase modulation regions $R_k$ may be main variables in the performance of the meta-lens ML.

In order for the meta-lens ML to function as a lens, the widths $W_1$, $W_k$, and $W_N$ of the phase modulation regions $R_k$ may not be constant, for example, may be set to decrease from the center C to the periphery. And, rules may be set in the phase modulation regions $R_k$ so that the direction of diffracting the incident light in the phase modulation regions $R_k$ is slightly different, that is, the deflection angle formed when the incident light passes through the phase modulation regions $R_k$ is slightly different. The distribution of the number N and the widths $W_1$, $W_k$, and $W_N$ of the phase modulation regions $R_k$ is related to the magnitude (an absolute value) of maximum refractive power of the meta-lens ML, and a sign of the refractive power may be determined according to whether the rule is in each of the phase modulation regions $R_k$. For example, the larger the maximum refractive power, the more the phase modulation regions $R_k$ of narrower widths may be used, and, in each the phase modulation regions $R_k$, positive refractive power may be implemented by the arrangement (the arrangement in which phase decreases) of rules in which the size of the fourth nanostructure NS4 decreases in the radial direction r, and negative refractive power may be implemented by the arrangement (the arrangement in which phase increases) of rules in which the size of the fourth nanostructure NS4 increases in the radial direction r. The shape distribution and phase profile of the fourth nanostructure NS4 illustrated in FIGS. 8 and 9, respectively, are shown in the shape of lens having the positive refractive power, which is an example. The meta-lens ML may be deformed to have the fourth nanostructures NS4 having a phase profile indicating the negative refractive power and a shape distribution suitable for the phase profile.

Referring to FIG. 8, the meta-lens ML includes the support layer SP and the fourth nanostructure NS4 disposed on the support layer SP. In addition, the meta-lens ML may further include a protective layer PR covering the fourth nanostructure NS4.

The support layer SP has a transparent property with respect to light in an operating wavelength band of the meta-lens ML, and may include any one of materials such as glass (fused silica, BK7, etc.), quartz, polymer (PMMA, SU-8, etc.) and other transparent plastic.

The fourth nanostructure NS4 includes a material having a refractive index difference from that of the surrounding material. The surrounding material may include a protective layer PR and a support layer SP. For example, the fourth nanostructure NS4 may have a high refractive index of a difference equal to or greater than 0.2 from the refractive index of the surrounding material, or a low refractive index of a difference equal to or greater than 0.2 from the refractive index of the surrounding material. The refractive index difference may be equal to or greater than 0.2, or equal to or greater than 0.5.

When the fourth nanostructure NS4 includes a material having a higher refractive index than that of the surrounding material, the fourth nanostructure NS4 may include at least one of c-Si, p-Si, a-Si III-V compound semiconductors (GaAs, GaP, GaN, etc.), SiC, $TiO_2$, SiN, and the surrounding material of the low refractive index may include a polymer material such as SU-8 and PMMA, $SiO_2$, or SOG.

When the fourth nanostructure NS4 includes a material having a lower refractive index than that of the surrounding material, the fourth nanostructure NS4 and the compensation structure CS may include $SiO_2$ or air, and surrounding material of the high refractive index may include at least one of c-Si, p-Si, a-Si III-V compound semiconductors (GaAs, GaP, GaN, etc.), SiC, $TiO_2$, SiN.

The fourth nanostructure NS4 may have a shape dimension smaller than a central wavelength $\lambda_0$ of the image light formed by the image forming device 110. The height of the fourth nanostructure NS4 may be in the range from $0.5\lambda_0$ to $7\lambda_0$.

The fourth nanostructure NS4 may have a cylindrical shape and, in addition, may have various shapes such as polygonal poles, elliptical poles, etc.

In FIGS. 7 to 9, the features of the meta-lenses 151 and 155 that may be included in the meta-lens module 150 shown in FIGS. 4 to 6 have been described, and the shapes and an arrangement of nanostructures provided in each of the meta-lenses 151 and 155 may be set to correspond to or match the refractive power to be implemented by the meta-lenses 151 and 155.

Figure 10:
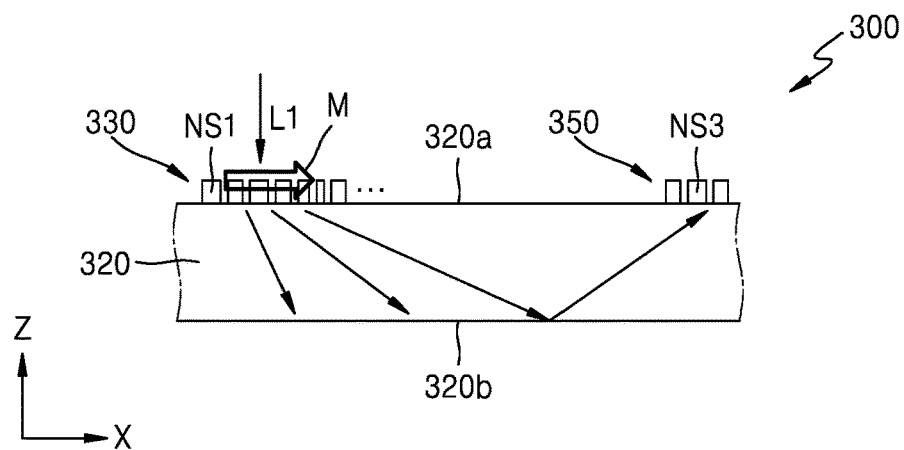
FIG. 10 is a conceptual diagram illustrating a detailed shape and optical action of an input coupler of a meta-waveguide provided in a display device according to the example embodiment.

FIG. 10 is a conceptual diagram illustrating a detailed shape and optical action of the input coupler 330 of the meta-waveguide 300 provided in a display device according to the example embodiment.

The input coupler 330 couples the image light L1 from the image projector 100 to the inside of the waveguide element 320. That is, the input coupler 330 may make the incident image light L1 reach the lower surface 320b of the waveguide element 320 at an angle at which total reflection occurs. The shape, size, arrangement, etc. of the plurality of first nanostructures NS1 constituting the input coupler 330 are set to form a first phase gradient in a first direction (X direction) so as to act a momentum M in the first direction on a ray flow of the incident image light L1. The plurality of first nanostructures NS1 are illustrated to be arranged in a single layer, but the present disclosure is not limited thereto, and the plurality of first nanostructures NS1 may be arranged in a plurality of layers.

Figure 11:
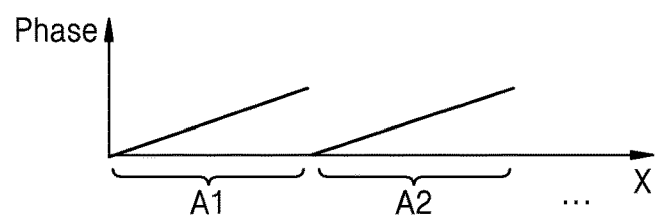
FIG. 11 is a graph showing a phase gradient by an input coupler.

FIG. 11 is a graph showing a phase gradient of the input coupler 330.

The phase gradient shown in the graph is a form in which a phase modulation pattern of a certain range is repeated in the first direction (X). The certain range may be 2π radians, but is not limited thereto. The repeating phase modulation pattern is illustrated as a straight line, but this is an example, and the repeating phase modulation pattern may be changed into various shapes maintaining monotony in which a direction of increase or decrease does not change. The sizes of regions A1 and A2 in which the phase modulation pattern is repeated may be the same or may change according to a certain rule in the first direction.

Figure 12:
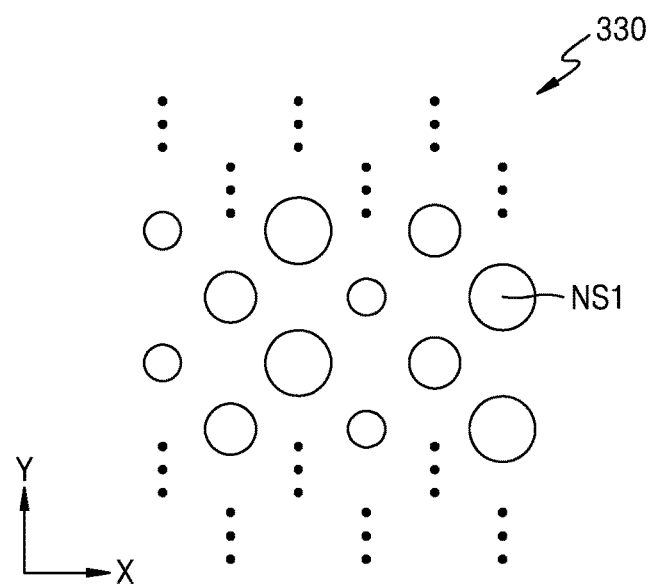
FIG. 12 is a plan view showing shapes and an arrangement of first nanostructures constituting an input coupler.

FIG. 12 is a plan view showing shapes and an arrangement of the plurality of first nanostructures NS1 constituting an input coupler.

The shape, size, arrangement, etc. of the plurality of first nanostructures NS1 are set to form a phase gradient as shown in FIG. 11 in the first direction (X direction). Among the plurality of first nanostructures NS1, the first nanostructures NS1 arranged on the same line and parallel to the Y direction perpendicular to the first direction may have the same shape and size.

Figure 13:
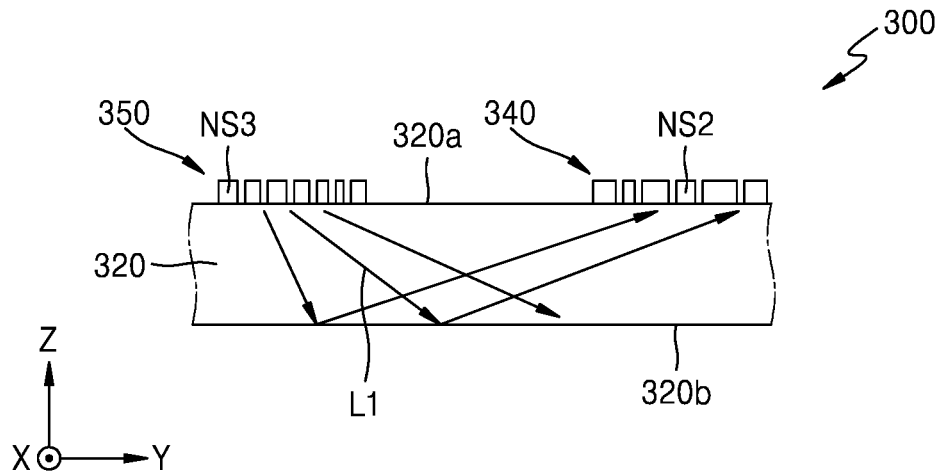
FIG. 13 is a conceptual diagram illustrating a detailed shape and optical action of a magnification coupler of a meta-waveguide provided in a display device according to the example embodiment.
Figure 14:
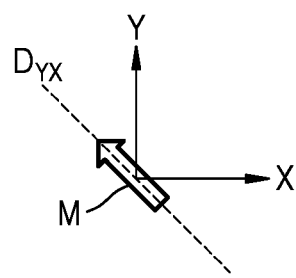
FIG. 14 is a conceptual diagram illustrating a direction of momentum of a magnification coupler acting on a ray flow of image light.

FIG. 13 is a conceptual diagram illustrating a detailed shape and optical action of the magnification coupler 350 of the meta-waveguide 300 provided in a display device according to the embodiment, and FIG. 14 is a conceptual diagram illustrating a direction of the momentum M of the magnification coupler 350 acting on a ray flow of the image light L1.

The magnification coupler 350 may gradually make part of the image light L1 traveling in the other direction (Y direction) with respect to the image light L1 coupled to the inside of the waveguide element 320 by the input coupler 330 to totally reflect the inside of the waveguide element 320 and magnify an X-direction width of the light traveling in the Y direction.

The ray flow of the image light L1 traveling inside the waveguide element 320 and reaching the magnification coupler 350 is at a state where the momentum M of the input coupler 330 acts on in the X direction. In order to change this ray flow in the Y direction, the direction of the momentum M may be set as shown in FIG. 14. This direction will be referred to as a third direction hereinafter. The third direction corresponds to a direction of a vector difference (Y−X) $D_{YX}$ between the Y direction and the X direction. The magnification coupler 350 may include a plurality of third nanostructures NS3 whose shape, size, arrangement, etc. are set to form a third phase gradient in the third direction to form such momentum. The plurality of third nanostructures NS3 are illustrated to be arranged in a single layer, but the present disclosure is not limited thereto, and the plurality of third nanostructures NS3 may be arranged in a plurality of layers.

Figure 15:
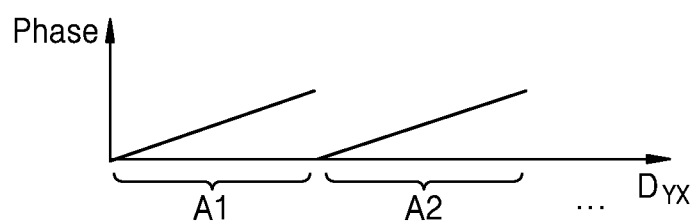
FIG. 15 is a graph showing a phase gradient by a magnification coupler.

FIG. 15 is a graph showing a phase gradient of the magnification coupler 350.

The phase gradient shown in the graph is a form in which a phase modulation pattern of a certain range is repeated in the third direction $D_{YX}$. The certain range may be 2π, but is not limited thereto. The repeating phase modulation pattern is illustrated as a straight line, but this is an example, and the repeating phase modulation pattern may be changed into various shapes maintaining monotony in which a direction of increase or decrease does not change. The sizes of the regions A1 and A2 in which the phase modulation pattern is repeated may be the same or may change according to a certain rule in the third direction.

Figure 16:
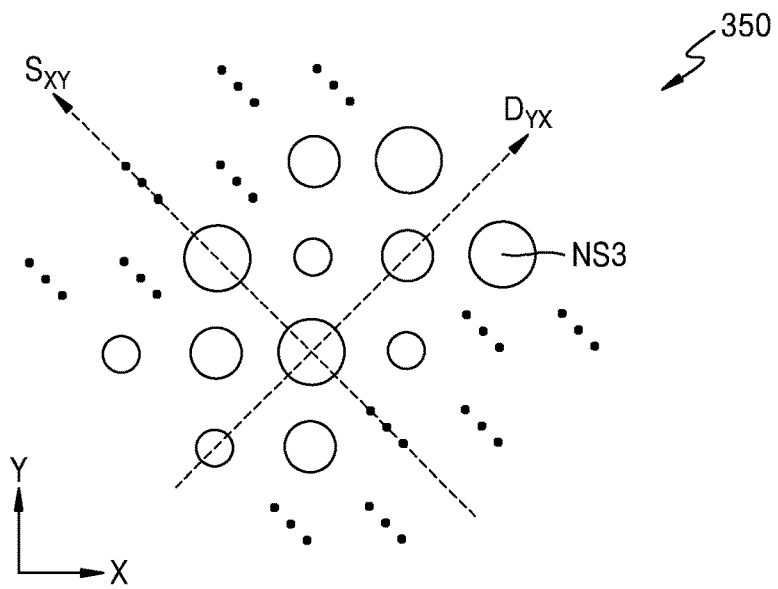
FIG. 16 is a plan view showing shapes and an arrangement of third nanostructures constituting a magnification coupler.

FIG. 16 is a plan view showing shapes and an arrangement of the plurality of third nanostructures NS3 constituting a magnification coupler.

The shape, size, arrangement, etc. of the plurality of third nanostructures NS3 are set to form a phase gradient as shown in FIG. 15 in the third direction ($D_{YX}$). Among the plurality of third nanostructures NS3, the third nanostructures NS3 arranged on the same line and parallel to a direction ($S_{XY}$) perpendicular to the third direction ($D_{YX}$) may have the same shape and size.

Figure 17:
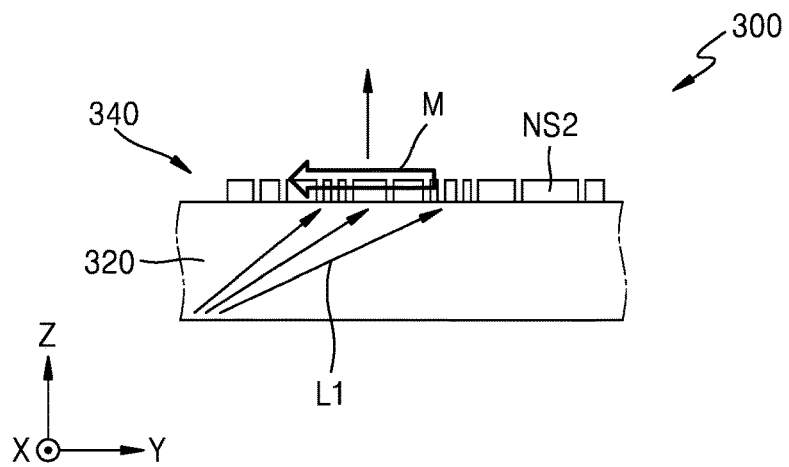
FIG. 17 is a conceptual diagram illustrating an optical action of an output coupler of a meta-waveguide provided in a display device according to an example embodiment.

FIG. 17 is a conceptual diagram illustrating an optical action of the output coupler 340 of a meta-waveguide provided in a display device according to an example embodiment.

The image light L1 magnified in the X direction inside the waveguide element 320 by the magnification coupler 350 and traveling inside the waveguide element 320 may reach the output coupler 340 and then may be output to the outside of the waveguide element 320. In order to form such a flow, the output coupler 340 may include the plurality of second nanostructures NS2 whose shape, size, arrangement, etc. are set to form a second phase gradient in a second direction (−Y direction). The plurality of second nanostructures NS2 are illustrated to be arranged in a single layer, but the present disclosure is not limited thereto, and the plurality of second nanostructures NS2 may be arranged in a plurality of layers.

Figure 18:
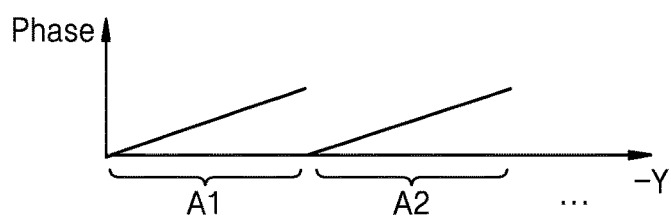
FIG. 18 is a graph showing a phase gradient by an output coupler.

FIG. 18 is a graph showing a phase gradient of the output coupler 340.

The phase gradient shown in the graph is a form in which a phase modulation pattern in a certain range is repeated in the second direction (−Y direction). The certain range may be 2π, but is not limited thereto. The repeating phase modulation pattern is illustrated as a straight line, but this is an example, and the repeating phase modulation pattern may be changed into various shapes maintaining monotony in which a direction of increase or decrease does not change. The sizes of the regions A1 and A2 in which the phase modulation pattern is repeated may be the same or may change according to a certain rule in the second direction.

Figure 19:
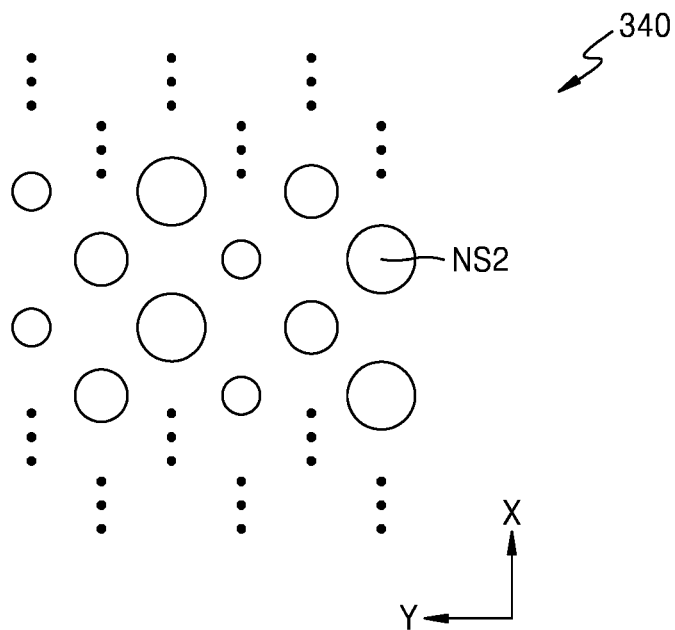
FIG. 19 is a plan view showing shapes and an arrangement of second nanostructures constituting a magnification coupler according to an example embodiment.

FIG. 19 is a plan view showing shapes and an arrangement of the second nanostructures NS2 constituting the output coupler 340.

The shape, size, arrangement, etc. of the plurality of second nanostructures NS2 are set to form a phase gradient as shown in FIG. 18 in the second direction (−Y direction). Among the plurality of second nanostructures NS2, the second nanostructures NS2 arranged on the same line and parallel to a direction perpendicular to the second direction may have the same shape and size.

The first nanostructure NS1, the second nanostructure NS2, and the third nanostructure NS3 illustrated in the above description are in a cylindrical shape, but are not limited thereto, and the first to third nanostructures NS1 to NS3 may be changed to various shapes. For example, the first to third nanostructures NS1 to NS3 may be changed to an elliptical column, a polygonal column, a column having an arbitrary cross-sectional shape, or an asymmetrical shape.

Each of the first nanostructures NS1, the second nanostructures NS2, and the third nanostructures NS3 illustrated in the above description includes a material having a refractive index difference from that of the surrounding material. For example, each of the first nanostructures NS1, the second nanostructures NS2, and the third nanostructures NS3 may have a high refractive index of a difference equal to or greater than 0.2 from the refractive index of the surrounding material, or a low refractive index of a difference equal to or greater than 0.2 from the refractive index of the surrounding material. The refractive index difference may be equal to or greater than 0.2, or equal to or greater than 0.5. Some of the first nanostructure NS1, the second nanostructure NS2, and the third nanostructure NS3 may have a refractive index higher than that of the surrounding material, and others may have a lower refractive index than that of the surrounding material.

When the first nanostructure NS1, the second nanostructure NS2, or the third nanostructure NS3 includes a material having a higher refractive index than that of the surrounding material, the first nanostructure NS1, the second nanostructure NS2, and the third nanostructure NS3 may include at least one of c-Si, p-Si, a-Si III-V compound semiconductors (GaAs, GaP, GaN, etc.), SiC, $TiO_2$, SiN, and the surrounding material of the low refractive index may include a polymer material such as SU-8 and PMMA, $SiO_2$, or SOG.

When the first nanostructure NS1, the second nanostructure NS2, or the third nanostructure NS3 includes a material having a lower refractive index than that of the surrounding material, the first nanostructure NS1, the second nanostructure NS2 or the third nanostructure NS3 may include $SiO_2$ or air, and surrounding material of the high refractive index may include at least one of c-Si, p-Si, a-Si III-V compound semiconductors (GaAs, GaP, GaN, etc.), SiC, $TiO_2$, SiN.

Each of the first nanostructure NS1, the second nanostructure NS2, and the third nanostructure NS3 may have a shape dimension smaller than the central wavelength $\lambda 0$ of image light output from an image projector. The height of each of the first nanostructure NS1 and the second nanostructure NS2 may be in the range from $0.5\lambda_0$ to $5\lambda_0$. The height of the third nanostructure NS3 may be in the range from $0.2\lambda_0$ to $4\lambda_0$.

The first nanostructure NS1, the second nanostructure NS2, and the third nanostructure NS3 may be integrally formed with the waveguide element 320 or may be combined with the waveguide element 320 after formed on a separate support layer.

In the above description, the input coupler 330 and the output coupler 340 have been described as operating as a transmission type. As light passes through the input coupler 330 and the output coupler 340, a ray flow of the light is changed by receiving a certain momentum action. The magnification coupler 350 changes the ray flow of light traveling inside the waveguide element 320, and thus the magnification coupler 350 operates as a reflective type. That is, the light is reflected from the magnification coupler 350 and the ray flow is changed by receiving the certain momentum action.

The input coupler 330 and the output coupler 340 are not limited to the transmissive type, and any one or both of them may be changed to the reflective type. When the input coupler 330 and the output coupler 340 operate as the reflective type, the shape dimensions of the first nanostructures NS1 and the second nanostructures NS2 may be different from when the input coupler 330 and the output coupler 340 operate as the transmissive type. The first nanostructure NS1 and the second nanostructure NS2 may have a shape dimension smaller than the central wavelength $\lambda_0$ of the image light output from the image projector. The height of each of the first nanostructure NS1 and the second nanostructure NS2 may be in the range from $0.2\lambda_0$ to $4\lambda_0$.

Figure 20:
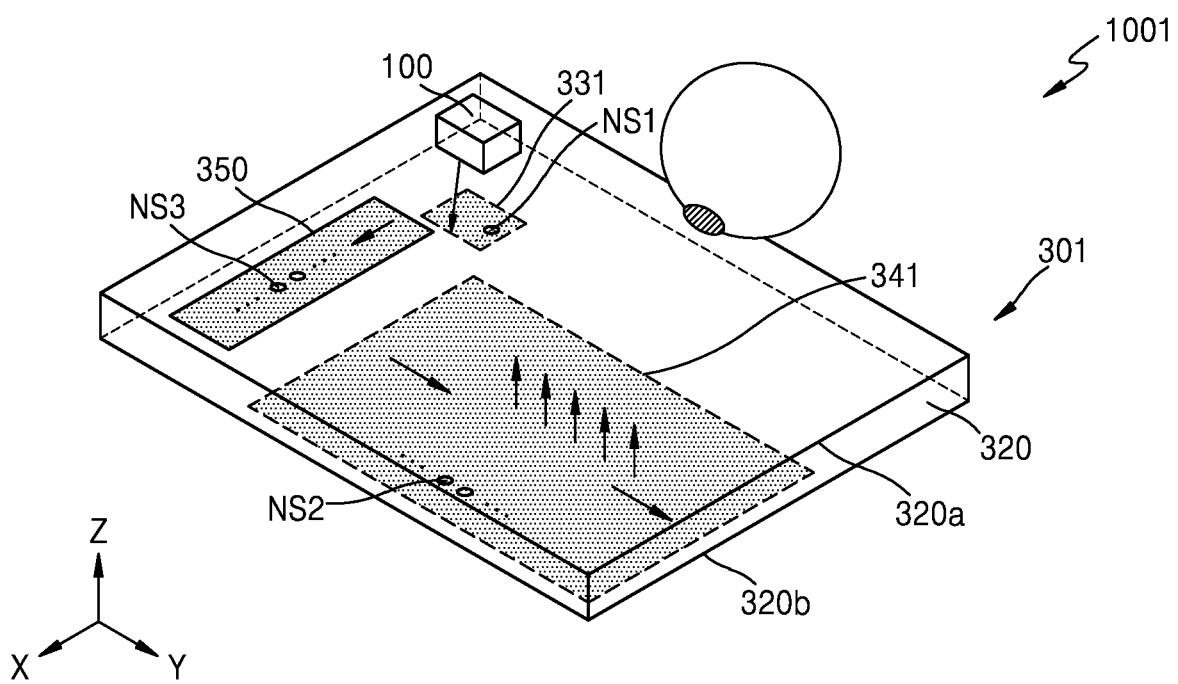
FIG. 20 is a perspective view showing a schematic configuration of a display device according to another example embodiment.
Figure 21:
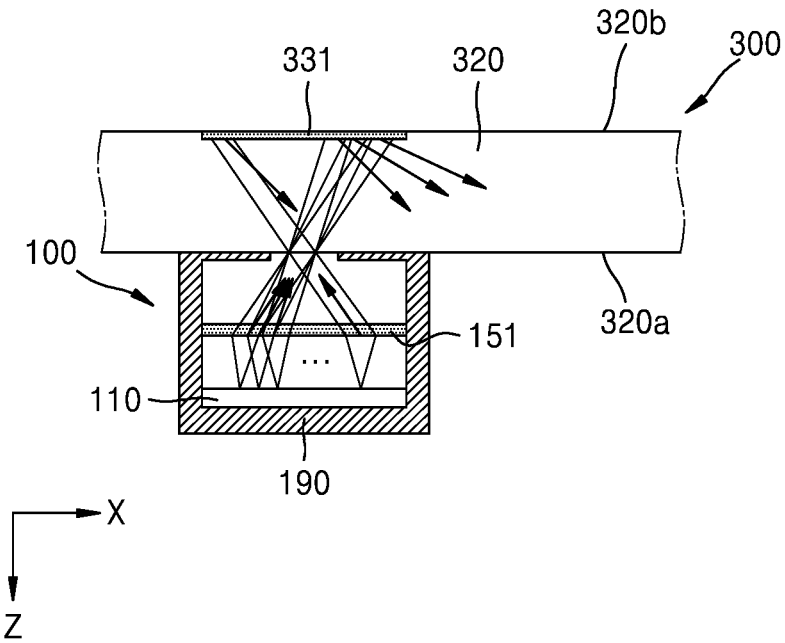
FIG. 21 shows a configuration of an image projector that inputs image light to a meta-waveguide through an input coupler in the display device of FIG. 20.

FIG. 20 is a perspective view showing a schematic configuration of a display device 1001 according to another example embodiment, and FIG. 21 shows a configuration of the image projector 100 that inputs image light to a meta-waveguide 301 through an input coupler 331 in the display device 1001 of FIG. 20.

The display device 1001 includes the image projector 100 and the meta-waveguide 301. The example embodiment illustrated in FIG. 20 is different from the display device 1000 of FIG. 1 in the arrangement positions of the input coupler 331 and an output coupler 341 of the meta-waveguide 301.

According to an example embodiment, the input coupler 331 and the output coupler 341 operate as reflective type couplers.

The input coupler 331 is provided on the lower surface 320b of the waveguide element 320, that is, the opposite surface of the upper surface 320a of the waveguide element 320 facing the image projector 100. The image light L1 in the image projector 100 may be incident into the waveguide element 320 through the upper surface 320a of the waveguide element 320, reflected on the input coupler 330 disposed on the lower surface 320b of the waveguide element 320 and then totally reflected in the waveguide element 320 and travel toward the first direction (X direction).

An output coupler 341 is also provided on the lower surface 320b of the waveguide element 320. The light reaching the output coupler 341 is reflected, a direction of a ray flow is changed, the light reaches the upper surface 320a of the waveguide element 320 at an angle smaller than a total reflection critical angle, and is output to the outside of the waveguide element 320.

According to another example embodiment, one of the input coupler 331 and the output coupler 341 may be a reflective type coupler and the other may be a transmissive type coupler.

Figure 22:
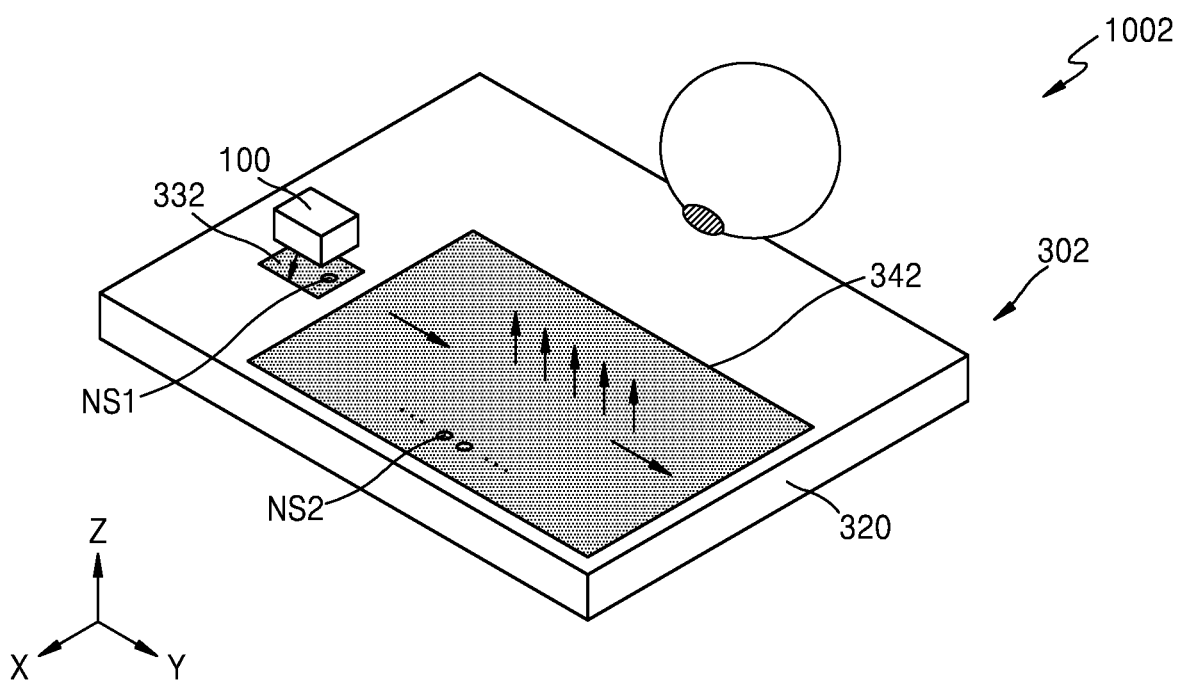
FIG. 22 is a perspective view showing a schematic configuration of a display device according to another example embodiment.

FIG. 22 is a perspective view illustrating a schematic configuration of a display device 1002 according to another example embodiment.

The display device 1002 of the example embodiment illustrated in FIG. 22 is different from the display device 1000 of FIG. 1 in that a magnification coupler is not separately provided.

The display device 1002 includes the image projector 100 and a meta-waveguide 302. The meta-waveguide 302 includes the waveguide element 320, an input coupler 332 coupling light to the inside of the waveguide element 320, and an output coupler 342 outputting light to the outside of the waveguide element 320.

The input coupler 332 inputs the image light L1 output from the image projector 100 to the waveguide element 320 at an angle that is totally reflected inside the waveguide element 320. When the light totally reflects the inside of the waveguide element 320 and traveling reaches the output coupler 340, the light is output to the outside of the waveguide element 320.

In the display device 1002 of the example embodiment, the input coupler 332 may be formed to serve as both the input coupler 330 and the magnification coupler 350 of the display device 1000 of FIG. 1. For example, the input coupler 332 may include a plurality of nanostructures and may have a phase gradient that acts a momentum in the X and Y directions on the image light L1. The output coupler 342 may include a plurality of nanostructures whose shape, arrangement, size, etc. are set to have a phase gradient acting a momentum in the −Y direction, similarly to the output coupler 340 of the display device 1000 of FIG. 1.

Alternatively, in the display device 1002 of the example embodiment, the output coupler 342 is formed to serve as both the magnification coupler 352 and the output coupler 342 of the display device 1000 of FIG. 1, and the input coupler 332 may be similar to the input coupler 3000 of the display device 1000 of FIG. 1.

Although both the input coupler 332 and the output coupler 342 are shown as a transmissive type, any one or both of them may be changed to a reflective type.

Figure 23:
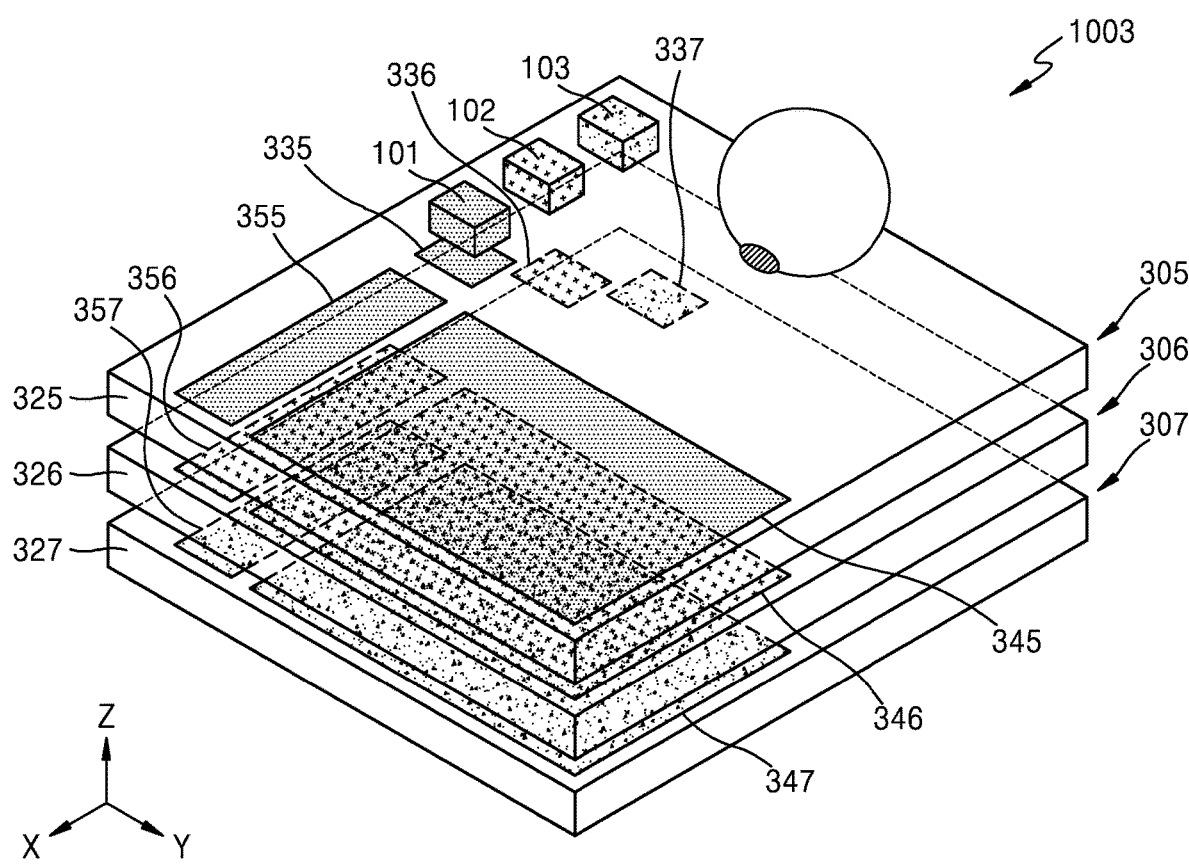
FIG. 23 is a perspective view showing a schematic configuration of a display device according to another example embodiment.
Figure 24:
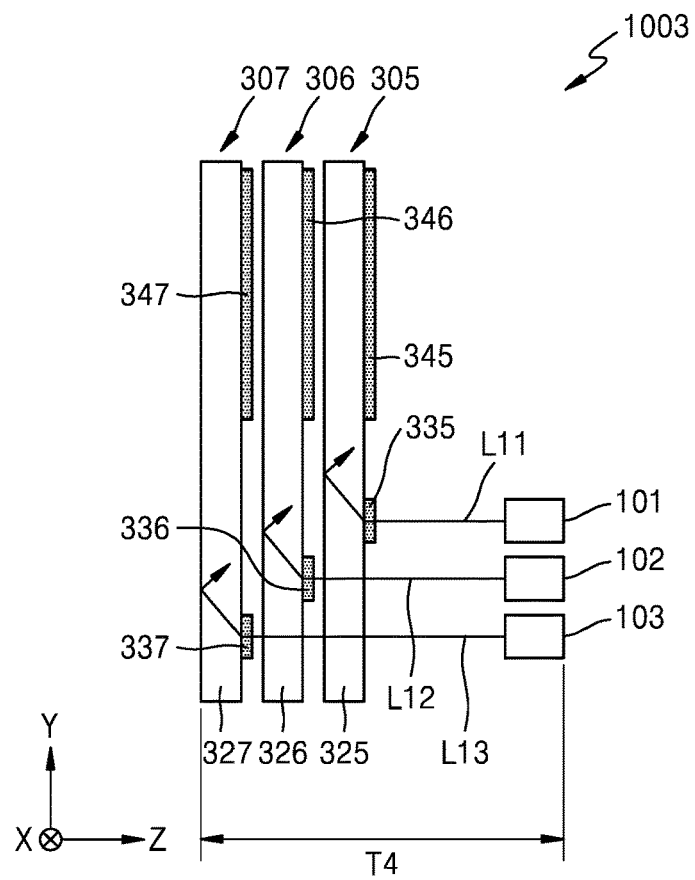
FIG. 24 is a side view showing a schematic configuration of the display device of FIG. 23 according to another example embodiment.

FIGS. 23 and 24 are a perspective view and a side view showing a schematic configuration of a display device 1003 according to another example embodiment.

The display device 1003 includes an image projector and a meta-waveguide.

The image projector includes a first image projector 101 that outputs an image light L11 of a first wavelength band, a second image projector 102 that outputs an image light L12 of a second wavelength band, and a third image projector 103 that outputs image light of a third wavelength band, and the meta-waveguide includes a first meta-waveguide 305 that transmits the image light L12 output from the first image projector 101 to the observer's field of view, a second meta-waveguide 306 that transmits the image light L12 output from the second image projector 102 to the observer's field of view, and a third meta-waveguide 307 that transmits the image light L13 output from the third image projector 103 to the observer's field of view.

Each of the first image projector 101, the second image projector 102, and the third image projector 103 includes an image forming device and a meta-lens module, similarly to the display device 1000 of FIG. 1. However, there are differences in that image forming devices form images of different wavelength bands, and detailed shapes, sizes, and arrangements of nanostructures are set so that meta-lenses provided in each meta-lens module operate on light of different wavelength bands.

The nanostructures provided in the first image projector 101 may have a shape dimension smaller than a central wavelength $\lambda_1$ of the first wavelength band, the nanostructures provided in the second image projector 102 may have a shape dimension smaller than a central wavelength $\lambda_2$ of the second wavelength band, and the nanostructures provided in the third image projector 103 may have a shape dimension smaller than a central wavelength $\lambda_3$ of the third wavelength band.

The first meta-waveguide 305 includes a waveguide element 325, an input coupler 335, an magnification coupler 355 and an output coupler 345, the second meta-waveguide 306 includes a waveguide element 326, an input coupler 336, an magnification coupler 356 and an output coupler 346, and the third meta-waveguide 307 includes a waveguide element 327, an input coupler 337, an magnification coupler 357 and an output coupler 347.

The input couplers 335, 336, and 337, the magnification couplers 355, 356, and 357, and the output couplers 345, 346, and 347 are respectively similar to the input coupler 330, the magnification coupler 350, and the output coupler 340 described in the display device 1000 of FIG. 1, but there is a difference in that detailed shape, size, arrangement, etc. of the nanostructures are set to operate on light of different wavelength bands.

The nanostructures provided in the first meta-waveguide 305 may have a shape dimension smaller than the central wavelength $\lambda_1$ of the first wavelength band, the nanostructures provided in the second meta-waveguide 306 a shape dimension smaller than the central wavelength $\lambda_2$ of the second wavelength band, and the nanostructures provided in the third meta-waveguide 307 may have a shape dimension smaller than the central wavelength $\lambda_3$ of the third wavelength band.

The first meta-waveguide 305, the second meta-waveguide 306, and the third meta-waveguide 307 may be arranged to overlap in the Z direction. In such an arrangement, the first wavelength band may be the shortest wavelength band, and then, the second wavelength band and the third wavelength band may be increased in the order of the wavelengths. For example, the first wavelength band may be a blue light band, the second wavelength band may be a green light band, and the third wavelength band may be a red light band.

A total thickness T4 of the display device 1003, as shown in FIG. 24, may range from 6 mm to 20 mm, or, range 6 mm to 25 mm.

Figure 25:
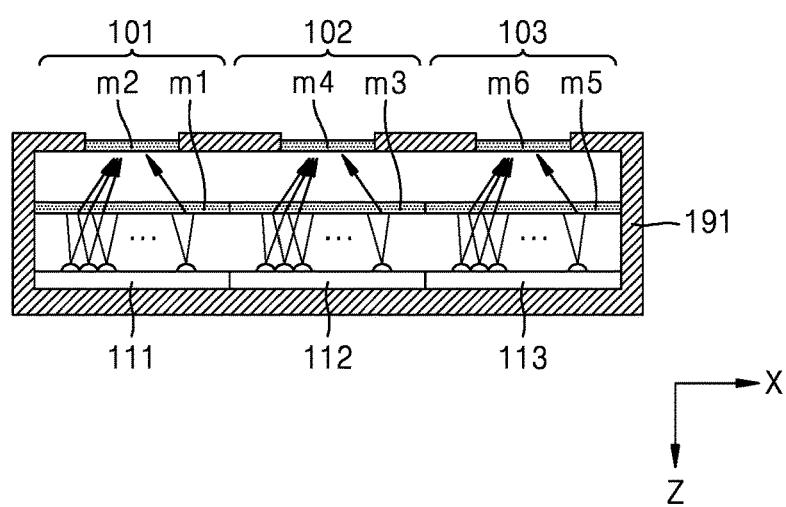
FIG. 25 shows an example in which first, second, and third image projectors are integrally implemented in the display device of FIG. 23.

FIG. 25 shows an example in which the first, second, and third image projectors 101, 102, and 103 are integrally implemented in the display device 1003 of FIG. 23.

The first image forming device 111 and meta-lenses m1 and m2, the second image forming device 112 and meta-lenses m3 and m4 corresponding thereto, and the third image forming device 113 and meta-lenses m5 and m6 corresponding thereto may have a structure fixed to one housing 191.

The above-described display device 1003 may implement a waveguide-based image system for each color, and thus crosstalk may be suppressed for each color, and light efficiency may increase.

Figure 26:
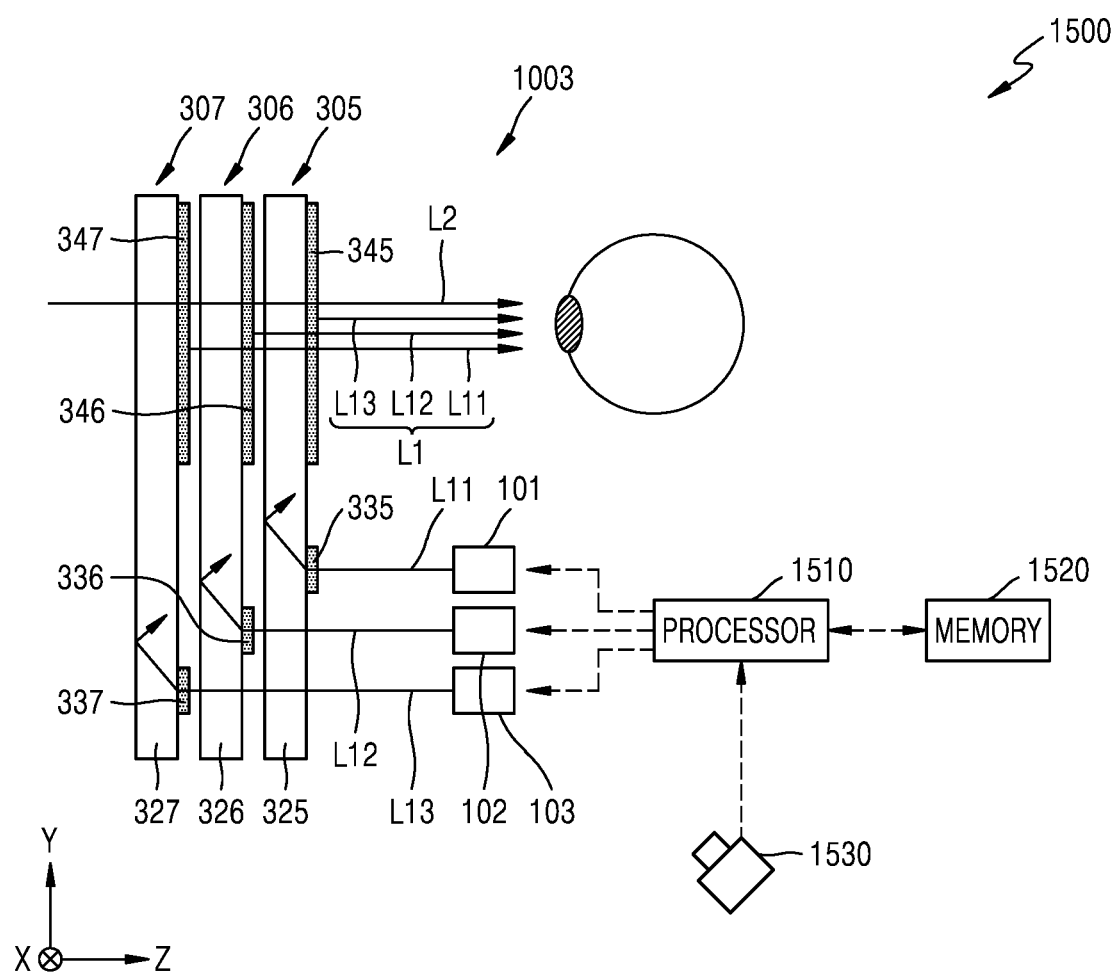
FIG. 26 is a conceptual diagram illustrating a schematic structure of an augmented reality device according to an example embodiment.

FIG. 26 is a conceptual diagram illustrating a schematic structure of an augmented reality device 1500 according to an example embodiment.

The augmented reality device 1500 includes a display device 1003, a processor 1510 that controls the display device 1003, and a memory 1520 in which codes of programs to be executed in a processor 1510, and other data, etc. are stored. The augmented reality device 1500 may also include a sensor 1530 for recognizing a user environment.

The first meta-waveguide 305, the second meta-waveguide 306, and the third meta-waveguide 307 provided in the display device 1003 respectively transfer the image light L1 by the light L11, L12, and L13 of different wavelength bands from the first image projector 101, the second image projector 102, and the third image projector 103 to an observer's field of view, and also transmit and transfer the ambient light L2 in front of an observer to the observer's field of view.

The first image projector 101, the second image projector 102, and the third image projector 103 may be controlled by the processor 1510 so that the image light L1 includes additional information corresponding to a user environment. For example, the user environment is recognized by the sensor 1530, and additional information images suitable for a result of recognition may be formed by the first, second, and third image projectors 101, 102 and 103 in consideration of the result of recognition.

The display device 1003 provided in the augmented reality device 1500 is illustrated as the display device of FIG. 23, but is not limited thereto, and the display devices 1000, 1001, and 1002 of the other embodiments or display devices modified therefrom may be employed.

FIGS. 27 to 30 illustrate external appearances of various electronic devices employing a display device according to an embodiment.

Figure 27:
FIGS. 27 to 30 illustrate external appearances of various electronic devices employing a display device according to an example embodiment.
Figure 28:
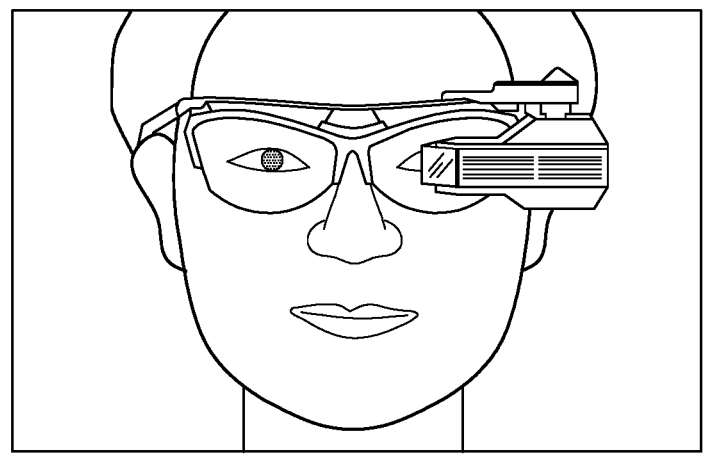
Figure 29:
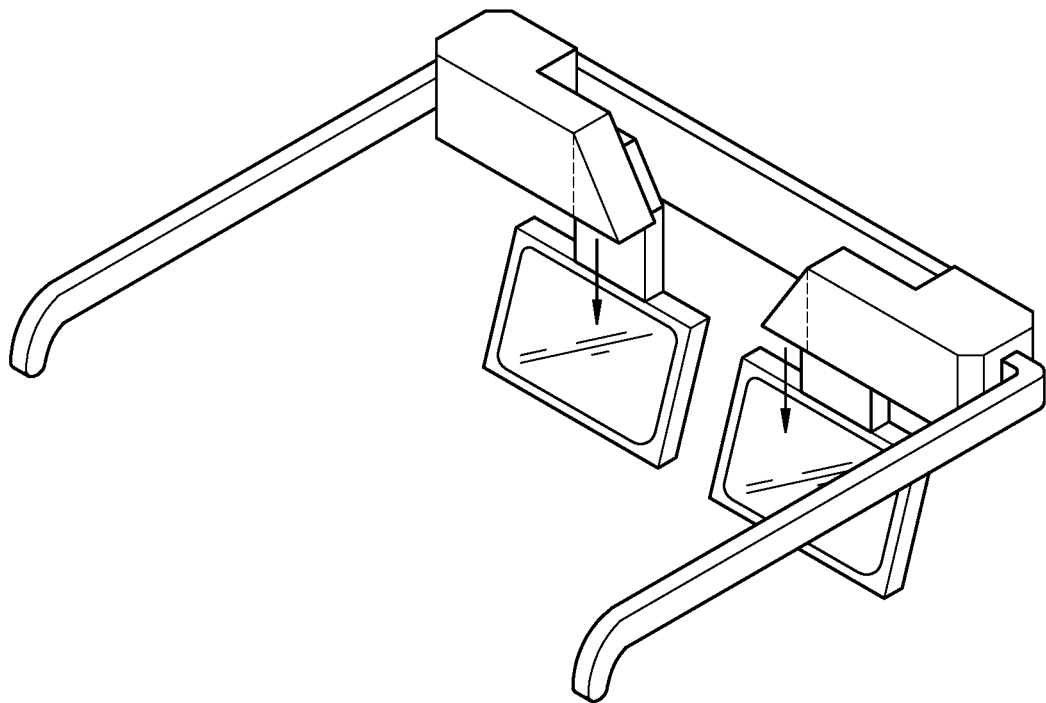

As illustrated in FIGS. 27 to 29, the display device may be applied to a wearable device. For example, the display device may be applied to a head mounted display (HMD). In addition, the display device may be applied to a glasses-type display, a goggle-type display, etc. The wearable electronic devices illustrated in FIGS. 27 to 29 may operate in synchronization with a smart phone. Such a display device is a head-mounted, glasses-type, or goggles-type virtual reality (VR) display device, augmented reality (AR) display device, or mixed reality (MR) display device that may provide virtual reality or provide both a virtual image and an external real image.

Figure 30:
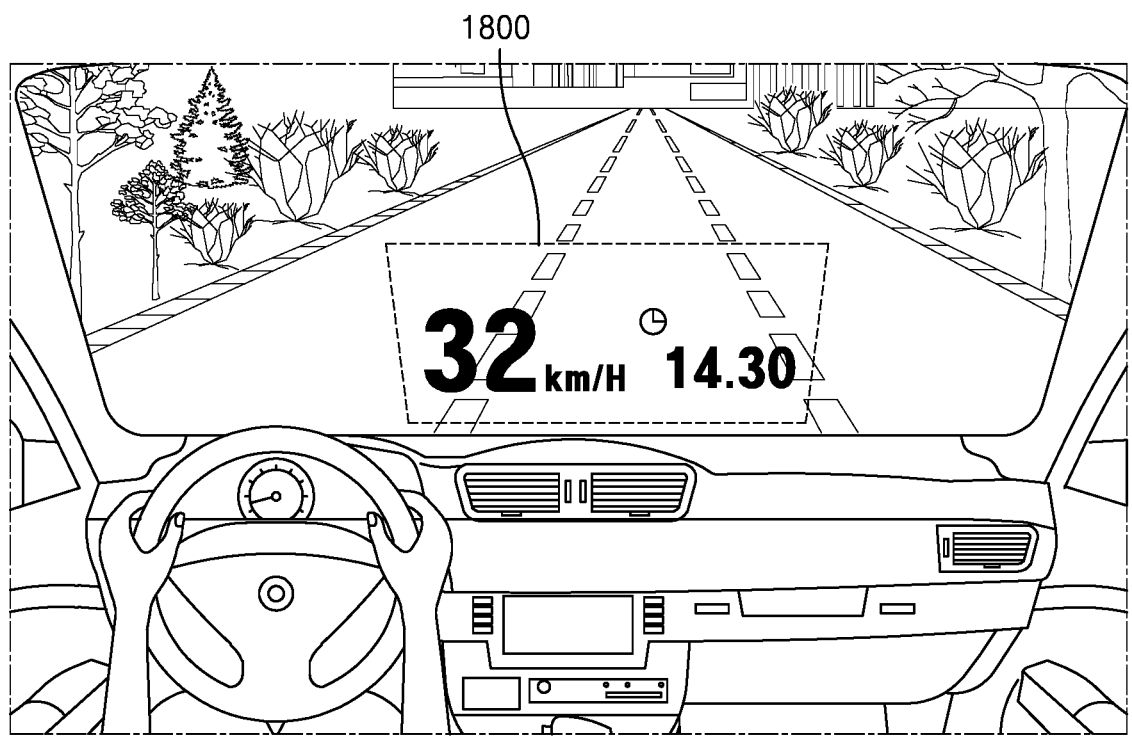

As illustrated in FIG. 30, the display device may be applied to a head-up display (HUD) 1800 of a vehicle.

Figure 31:
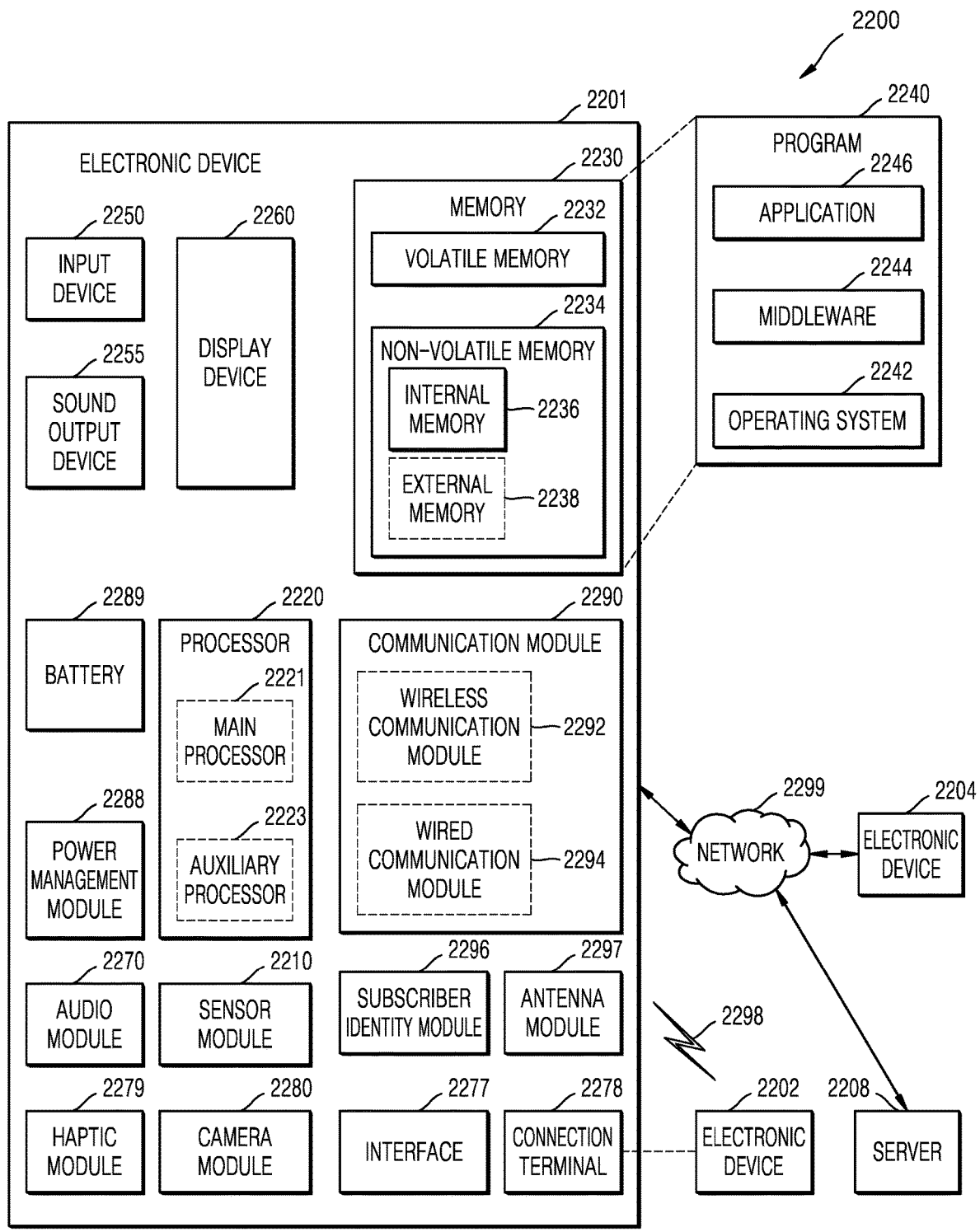
FIG. 31 is a block diagram showing an electronic device according to an example embodiment.

FIG. 31 is a block diagram showing an electronic device according to an embodiment.

Referring to FIG. 31, the electronic device 2201 may communicate with another electronic device 2202 through a first network 2298 (local area communication network, etc.) or may communicate with another electronic device 2204 and/or server 2208 through a second network 2299 (far-field communication network, etc.) in a network environment 2200. The electronic device 2201 may communicate with the electronic device 2204 through the server 2208. The electronic device 2201 may include a processor 2220, a memory 2230, an input device 2250, a sound output device 2255, a display device 2260, an audio module 2270, a sensor module 2210, an interface 2277, a haptic module 2279, a camera module 2280, a power management module 2288, a battery 2289, a communication module 2290, a subscriber identity module 2296, and/or an antenna module 2297. Some of these components may be excluded from or other components may be added to the electronic device 2201. Some of these components may be implemented as one integrated circuit. For example, a fingerprint sensor, an iris sensor, an illuminance sensor, etc. of the sensor module 2210 may be embedded in the display device 2260 (a display, etc.)

The processor 2220 may execute software (a program 2240) to control one or a plurality of other constituent elements (hardware and software components, etc.) of the electronic device 2201 connected to the processor 2220 by executing software (a program 2240, and the like), and may perform a variety of data processing or calculations. As part of data processing or operations, the processor 2220 may load commands and/or data received from other components (the sensor module 2210, the communication module 2290, etc.) to a volatile memory 2232, process the commands and/or data stored in the volatile memory 2232, and store resulting data in a non-volatile memory 2234. The processor 2220 may include a main processor 2221 (a central processing unit, an application processor, etc.), and an auxiliary processor 2223 (a graphics processing device, an image signal processor, a sensor hub processor, a communication processor, etc.) that is operable independently from or together with the main processor 2221. The auxiliary processor 2223 may use less power than the main processor 2221, and may perform a specialized function.

The auxiliary processor 2223 may control functions and/or states related to some components (the display device 2260, the sensor module 2210, the communication module 2290, etc.) of the electronic device 2201 instead of the main processor 2221 when the main processor 2221 is in an inactive state (a sleep state), or together with the main processor 2221 when the main processor 2221 is in an active state (an application execution state). The auxiliary processor 2223 (the image signal processor, the communication processor, etc.) may be implemented as part of other functionally related components (the camera module 2280, the communication module 2290, etc.).

The memory 2230 may store a variety of data required by the components (the processor 2220, the sensor module 2210, etc.) of the electronic device 2201. The data may include, for example, software (the program 2240, etc.), and input data and/or output data with respect to commands related to the software. The memory 2230 may include the volatile memory 2232 and/or the non-volatile memory 2234.

The program 2240 may be stored in the memory 8230 as software, and may include an operating system 2242, middleware 2244, and/or an application 2246.

The input device 2250 may receive commands and/or data to be used in the components (the processor 2220, etc.) of the electronic device 2201 from outside (a user, etc.) the electronic device 2201. The input device 2250 may include a microphone, a mouse, a keyboard, and/or a digital pen (a stylus pen).

The sound output device 2255 may output a sound signal to the outside of the electronic device 2201. The sound output device 2255 may include a speaker and/or a receiver. The speaker may be used for general purposes such as multimedia playback or record playback, and the receiver may be used to receive an incoming call. The receiver may be incorporated as a part of the speaker or implemented as an independent separate device.

The display device 2260 may visually provide information to the outside of the electronic device 2201. The display device 2260 may include a display, a hologram device, or a projector, and a control circuit for controlling the corresponding device. The display device 2260 may include touch circuitry set to sense a touch, and/or a sensor circuit (a pressure sensor, etc.) set to measure the intensity of a force generated by the touch. The display device 2260 may include any one of the above-described display devices 1000, 1001, 1002, and 1003, or a display device of a structure modified therefrom. A plurality of display devices 2260 may be provided.

The audio module 2270 may convert sound to an electric signal, or convert the electric signal to sound. The audio module 2270 may obtain sound through the input device 2250, or may output sound through a speaker and/or a headphone of another electronic device (the electronic device 2102, etc.) which is directly or wirelessly connected to the sound output device 2255 and/or the electronic device 2201.

The sensor module 2210 may sense an operating state (power, temperature, etc.) of the electronic device 2201 or an external environment state (a user state, etc.) and may generate an electrical signal and/or a data value corresponding to the sensed state. The sensor module 2210 may include a fingerprint sensor, an acceleration sensor, a location sensor, a 3D sensor, and may further include an iris sensor, a gyro sensor, a pressure sensor, a magnetic sensor, a grip sensor, a proximity sensor, a color sensor, an infrared (IR) sensor, a biometric sensor, a temperature sensor, a humidity sensor, and/or an illuminance sensor.

An interface 2277 may support one or more designated protocols that may be used for directly or wirelessly connecting the electronic device 2201 to another electronic device (the electronic device 2102, etc.). The interface 2277 may include a High Definition Multimedia Interface (HDMI), a Universal Serial Bus (USB) interface, an SD card interface, and/or an audio interface.

A connection terminal 2278 may include a connector used to physically connect the electronic device 2201 with another electronic device (the electronic device 2102, etc.) The connection terminal 2278 may include an HDMI connector, a USB connector, an SD card connector, and/or an audio connector (a headphone connector, etc.)

The haptic module 2279 may convert the electric signal into a mechanical stimulus (vibration, movement, etc.) or an electrical stimulus that may be recognized by the user through tactile sense or kinesthetics. The haptic module 2279 may include a motor, a piezoelectric effect element, and/or an electric stimulation device.

The camera module 2280 may capture still images and moving images. The camera module 2280 may include a lens assembly including one or more lenses, image sensors, image signal processors, and/or flashes.

The application 2246 may include one or more applications executed in connection with the display device 2260. Such an application 2246 may display additional information suitable for a user environment on the display device 2260. For example, the camera module 2280 may be utilized as a sensor recognizing the user environment, and additional information necessary according to a result of recognition may be displayed on the display device 2260.

The power management module 2288 may manage power supplied to the electronic device 2201. The power management module 2288 may be implemented as part of a Power Management Integrated Circuit (PMIC).

The battery 2289 may supply power to the components of the electronic device 2201. The battery 2289 may include a rechargeable primary cell, a rechargeable secondary cell, and/or a fuel cell.

The communication module 2290 may support establishing a direct (wired) communication channel and/or a wireless communication channel between the electronic device 2201 and another electronic device (the electronic devices 2102 and 2104, the server 2108, etc.) and performing communication through the established communication channel. The communication module 2290 may operate independently from the processor 2220 (the application processor, etc.) and may include one or more communication processors that support direct communication and/or wireless communication. The communication module 2290 may include a wireless communication module 2292 (a cellular communication module, a local area communication module, a global navigation satellite system (GNSS) communication module, etc.) and/or a wired communication module 2294 (a local area network (LAN) communication module, a power line communication module, etc.). Among these communication modules, the corresponding communication module may communicate with another electronic device through the first network 2298 (the local area communication network such as Bluetooth, WiFi Direct, or infrared data association (IrDA)) or the second network 2299 (the wide area communication network such as a cellular network, the Internet, or a computer network (a local area network (LAN), a wide area network (WAN), etc.)) A variety of types of communication modules may be integrated into one component (a single chip, etc.), or may be implemented as a plurality of components separate from each other (plural chips). The wireless communication module 2292 may check and authenticate the electronic device 2201 in the communication network such as the first network 2298 and/or the second network 2299 using subscriber information stored in the subscriber identity module 2296 (International mobile subscriber identifier (IMSI), etc.).

The antenna module 2297 may transmit a signal and/or power to the outside (another electronic device, etc.) or receive the signal and/or power from the outside. An antenna may include a radiator including a conductive pattern formed on a substrate (a PCB, etc.). The antenna module 2297 may include one or a plurality of antennas. When a plurality of antennas are included, the communication module 2290 may select an antenna suitable for the communication method used in a communication network such as the first network 2298 and/or the second network 2299 from among the plurality of antennas. Through the selected antenna, a signal and/or power may be transmitted or received between the communication module 2290 and another device. In addition to the antenna, another component (RFIC, etc.) may be included as part of the antenna module 2297.

Some of the components may be connected to each other through communication methods between surrounding devices (a bus, general purpose input and output (GPIO), serial peripheral interface (SPI), mobile industry processor interface (MIPI), etc.) and may interchange signals (commands, data, etc.)

Commands or data may be transmitted or received between the electronic device 2201 and the external electronic device 2204 through the server 2208 connected to the second network 2299. The other electronic devices 2202 and 2204 may be the same as or different from the electronic device 2201. All or some of operations executed by the electronic device 2201 may be executed by one or more of the other electronic devices 2202, 2204, and 2208. For example, when the electronic device 2201 is required to perform a function or a service, instead of executing the function or service on its own, the electronic device 2201 may request the one or more other electronic devices to execute the function or the service partially or wholly. One or more other electronic devices requested to execute the function or the service may execute an additional function or service, and transmit a result of execution to the electronic device 2201. To this end, cloud computing, distributed computing, and/or client-server computing technology may be used.

The above-described display device may have a thin optical system based on the nanostructure and the waveguide.

The above-described display device may separately implement an image system for each color, and thus crosstalk may be suppressed and light efficiency may be increased, thereby enabling low-power driving.

The above-described display device may be applied to various electronic devices, such as an augmented reality device, a wearable device, and a head-up display.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A display device comprising:
    an image projector comprising an image forming device, the image projector configured to output image light formed by the image forming device; and
    a meta-waveguide configured to transfer the image light output from the image projector, to a field of view of a user, the meta-waveguide comprising: a waveguide element configured to totally reflect light inside the waveguide element, an input coupler comprising a plurality of first nanostructures configured to form a first phase gradient in a first direction, the input coupler configured to couple the image light from the image projector to the inside of the waveguide element, wherein the first phase gradient is in a form in which a phase modulation pattern of a monotonic increase or decrease in a first range is repeated in the first direction, and an output coupler comprising a plurality of second nanostructures configured to form a second phase gradient in a second direction different from the first direction, the output coupler configured to output the image light coupled to the inside of the waveguide element by the input coupler, to an outside of the waveguide element, wherein the second phase gradient is in a form in which a phase modulation pattern of a monotonic increase or decrease in a second range is repeated in the second direction, wherein the plurality of first nanostructures and the plurality of second nanostructures are columnar structures.

2. The display device of claim 1,
wherein the meta-waveguide further comprises a magnification coupler provided between the input coupler and the output coupler, the magnification coupler comprising a plurality of third nanostructures configured to form a third phase gradient corresponding the image light in a third direction different from the first direction and the second direction.

3. The display device of claim 2,
wherein the third direction is a direction opposite to a vector sum of the first direction and the second direction.

4. The display device of claim 1,
wherein the image projector further comprises a meta-lens module comprising one or more meta-lenses, the meta-lens being configured to make the image light formed by the image forming device to be incident on the input coupler.

5. The display device of claim 4,
wherein the one or more meta-lenses comprise a substrate and a plurality of fourth nanostructures arranged on a first surface of the substrate, having a first refractive index higher than a second refractive index of the substrate and having a shape dimension smaller than a central wavelength of the image light formed by the image forming device.

6. The display device of claim 5,
wherein a height of the fourth nanostructures is in a range from $0.5\lambda 0$ to $7\lambda 0$, when $\lambda 0$ is the central wavelength.

7. The display device of claim 5,
wherein a shape or an arrangement of each of the plurality of fourth nanostructures are set so that a phase modulation pattern in a fourth range is repeated from a center of the one or more meta-lenses in a radial direction.

8. The display device of claim 5,
wherein the meta-lens module further comprises a micro lens array comprising a micro lens corresponding to each of a plurality of pixels of the image forming device.

9. The display device of claim 8,
wherein the micro lens array is integrally formed on a second surface of the substrate different from the first surface of the substrate.

10. The display device of claim 1,
wherein the first phase gradient is in a form in which a phase modulation pattern of a first range is repeated in the first direction.

11. The display device of claim 10,
wherein the plurality of first nanostructures are two-dimensionally arranged, and
wherein two or more of the plurality of first nanostructures arranged on a same line in a direction perpendicular to the first direction have a same shape and size.

12. The display device of claim 1,
wherein the second phase gradient is in a form in which a phase modulation pattern of a second range is repeated in the second direction.

13. The display device of claim 12,
wherein the plurality of second nanostructures are two-dimensionally arranged, and
wherein two or more of the plurality of second nanostructures arranged on a same line in a direction perpendicular to the second direction have a same shape and size.

14. The display device of claim 2,
wherein the third phase gradient is in a form in which a phase modulation pattern of a third range is repeated in the third direction.

15. The display device of claim 14,
wherein the plurality of third nanostructures are two-dimensionally arranged, and
wherein two or more of the plurality of third nanostructures arranged on a same line in a direction perpendicular to the third direction have a same shape and size.

16. The display device of claim 2,
wherein each of the plurality of first, second, and third nanostructures has a shape dimension smaller than a central wavelength of the image light output from the image projector.

17. The display device of claim 2,
wherein the plurality of first nanostructures, the plurality of second nanostructures, or the plurality of third nanostructures are integrally formed with the waveguide element.

18. The display device of claim 2,
wherein the plurality of first nanostructures, the plurality of second nanostructures, or the plurality of third nanostructures are arranged in a plurality of layers.

19. The display device of claim 2,
wherein the image projector comprises:
a first image projector configured to output image light of a first wavelength band;
a second image projector configured to output image light of a second wavelength band; and
a third image projector configured to output image light of a third wavelength band, and
wherein the meta-waveguide comprises:
a first meta-waveguide configured to transfer the image light output from the first image projector, to the field of view of the user;
a second meta-waveguide configured to transfer the image light output from the second image projector, to the field of view of the user; and
a third meta-waveguide configured to transfer the image light output from the third image projector, to the field of view of the user.

20. The display device of claim 19,
wherein among the plurality of first, second, and third nanostructures, each of nanostructures provided in the first meta-waveguide has a shape dimension smaller than a central wavelength of the first wavelength band, each of nanostructures provided in the second meta-waveguide has a shape dimension smaller than a central wavelength of the second wavelength band, and each of nanostructures provided in the third meta-waveguide has a shape dimension smaller than a central wavelength of the third wavelength band.

21. The display device of claim 1, wherein the meta-waveguide is configured to transmit ambient light that is incident in front of the user.

22. The display device of claim 1, wherein the display device is a wearable device.

23. An electronic device comprising the display device of claim 1.

24. The electronic device of claim 23, wherein the electronic device is a vehicle, an augmented reality device, a virtual reality device, a mobile device, or a smart phone.

* * * * *